(12) United States Patent
Agarwal

(10) Patent No.: US 10,609,090 B2
(45) Date of Patent: *Mar. 31, 2020

(54) REDUCING NETWORK PROTOCOL OVERHEAD

(71) Applicant: T-Mobile USA, Inc., Bellevue, WA (US)

(72) Inventor: Bikash Agarwal, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,752

(22) Filed: May 29, 2019

(65) Prior Publication Data

US 2019/0342347 A1 Nov. 7, 2019

Related U.S. Application Data

(63) Continuation of application No. 15/970,333, filed on May 3, 2018, now Pat. No. 10,326,804.

(51) Int. Cl.
*H04W 40/00* (2009.01)
*H04L 29/06* (2006.01)
(Continued)

(52) U.S. Cl.
CPC ......... *H04L 65/1006* (2013.01); *H04L 12/66* (2013.01); *H04L 65/1016* (2013.01);
(Continued)

(58) Field of Classification Search
CPC . H04L 65/1006; H04L 12/66; H04L 65/1069; H04L 67/02; H04L 69/08;
(Continued)

(56) References Cited

U.S. PATENT DOCUMENTS

| | | |
|---|---|---|
| 8,451,988 B2 | 5/2013 | Cai et al. |
| 2004/0209605 A1 | 10/2004 | Urban et al. |

(Continued)

OTHER PUBLICATIONS

Engel, Tobias, "SS7: Locate. Track. Manipulate.", published Dec. 31, 2014, retrieved Feb. 26, 2018 from <<https://berlin.ccc.de/~tobias/31c3-ss7-locate-track-manipulate.pdf>>, pp. 3, 4, 6, 7, 9, 10, 13, 17, 40, 43, 50-53.

(Continued)

*Primary Examiner* — Danh C Le
(74) *Attorney, Agent, or Firm* — Lee & Hayes, P.C.

(57) ABSTRACT

A telecommunications network includes a telephony application server (TAS). In some examples, the TAS receives, from a terminal, a session-initiation request identifying a called party. The TAS sends structured text (e.g., XML or JSON) identifying the called party (e.g., data of an anyTimeInterrogation query payload) to an information server (e.g., an HLR), which responds with structured text of a destination-terminal address dynamically bound to a terminal associated with the called party (e.g., data of a sendRoutingInformation reply payload). In some examples, the TAS receives Unstructured Supplementary Service Data (USSD) request data from a terminal. The TAS sends structured text indicating the USSD string and an identifier of the terminal to a USSD gateway via an Internet-Protocol-based Lightweight Protocol (IPLP), e.g., HTTPS, and receives structured text including USSD answer data. The TAS sends, to the terminal, a report message comprising the USSD answer data.

20 Claims, 10 Drawing Sheets

(51) Int. Cl.
*H04L 29/08* (2006.01)
*H04L 12/66* (2006.01)
*H04W 36/00* (2009.01)
*H04W 4/16* (2009.01)

(52) U.S. Cl.
CPC .......... *H04L 65/1069* (2013.01); *H04L 67/02* (2013.01); *H04L 69/08* (2013.01); *H04W 4/16* (2013.01); *H04W 36/0022* (2013.01)

(58) Field of Classification Search
CPC .. H04L 10/16; H04W 36/0022; H04W 88/02; H04M 1/72519; H04M 1/72522
USPC ...................... 455/445, 550.1, 466
See application file for complete search history.

(56) References Cited

U.S. PATENT DOCUMENTS

| | | | |
|---|---|---|---|
| 2008/0200151 A1 | 8/2008 | Lohr | |
| 2010/0153533 A1* | 6/2010 | Chung | H04W 48/08 709/223 |
| 2010/0279650 A1* | 11/2010 | Asawa | H04L 12/1403 455/406 |
| 2012/0110192 A1 | 5/2012 | Lu et al. | |
| 2013/0095814 A1* | 4/2013 | Mottes | G06F 9/461 455/420 |
| 2014/0258456 A1* | 9/2014 | Lee | H04L 69/22 709/217 |
| 2014/0368601 A1 | 12/2014 | deCharms | |
| 2015/0319300 A1 | 11/2015 | Arbe et al. | |
| 2016/0014580 A1* | 1/2016 | Kim | H04L 51/02 455/414.1 |
| 2016/0099947 A1 | 4/2016 | Asai et al. | |
| 2016/0247188 A1 | 8/2016 | Zhou | |
| 2017/0048656 A1* | 2/2017 | Kwon | H04L 12/66 |
| 2017/0212647 A1* | 7/2017 | Wang | H04M 3/493 |
| 2017/0287074 A1 | 10/2017 | Aber et al. | |
| 2018/0041550 A1* | 2/2018 | Mufti | H04L 65/1006 |
| 2019/0149365 A1* | 5/2019 | Chatterjee | H04L 25/0226 370/329 |

OTHER PUBLICATIONS

"ETSI TS 123 292 V12.5.0, Technical Specification", Jan. 2015, pp. 8, 10-17, 21-23, 26-39, and 117-119.
"ETSI TS 129 002 V13.3.0, Technical Specification," Apr. 2016, pp. 36-40, 182-183, 194-195, 234-235, 351, 357, 358, 412, 414, 417, 430-433, 643-644, and 905.
"ETSI TS 131 102 V14.4.0, Technical Specification", Jan. 2018, pp. 1, 44 and 127-130.
Office Action for U.S. Appl. No. 15/970,333, dated Sep. 19, 2018, Agarwal, "Reducing Network Protocol Overhead", 8 pages.
Loughney, et al., "Signalling Connection Control Part User Adaptation Layer (SUA)", RFC 3868 (Standards Track), Oct. 2004, pp. 1, 74-79, and 85.
Morneault, et al., "Signaling System 7 (SS7) Message Transfer Part 3 (MTP3)—User Adaptation Layer (M3UA)", RFC 4666 (Standards Track), Sep. 2006, pp. 1, 9, and 21-23.
Dierks, et al., "The Transport Layer Security (TLS) Protocol Version 1.2", RFC 5246 (Standards Track), Aug. 2008, pp. 1, 4, 5, 19, 65, and 78.
"Signalling Connection Control Part Formats and Codes", International Telecommunication Union, Q.713, Mar. 2001, pp. 8 and 9.
"Signalling Connection Control Part User Guide", International Telecommunication Union, Q.715, Apr. 2002, pp. 22 and 23.
"Signalling Control Part Procedures", International Telecommunication Union, Q.714, May 2001, pp. 6 and 7.
"3rd Generation Partnership Project; Technical Specification Group Core Network and Terminals; Basic call handling; Technical realization (Release 14)", 3GPP TS 23.018 V14.0.0, Mar. 21, 2017, 301 pages.
PCT Search Report and Written Opinion dated Aug. 6, 2019 for PCT Application No. PCT/US2019/028153, 10 pages.

* cited by examiner

US 10,609,090 B2

REDUCING NETWORK PROTOCOL OVERHEAD

CROSS-REFERENCE TO RELATED APPLICATION

This application is a continuation of, and claims priority to, U.S. application Ser. No. 15/970,333, entitled "REDUCING NETWORK PROTOCOL OVERHEAD", filed on May 3, 2018, and is fully incorporated by reference herein.

BACKGROUND

Many computing devices configured for telecommunications ("terminals"), such as smartphones, are capable of communicating via various types of networks. For example, cellular and other portable terminals may connect with circuit-switched (CS) networks such as the Global System for Mobile Communications (GSM) or more recent packet-switched (PS) networks such as Long Term Evolution (LTE) or other Internet Protocol (IP)-based networks. Network operators often maintain legacy network devices in their networks to support older protocols or communication techniques, such as CS voice calls.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Definitions

Figure 1:
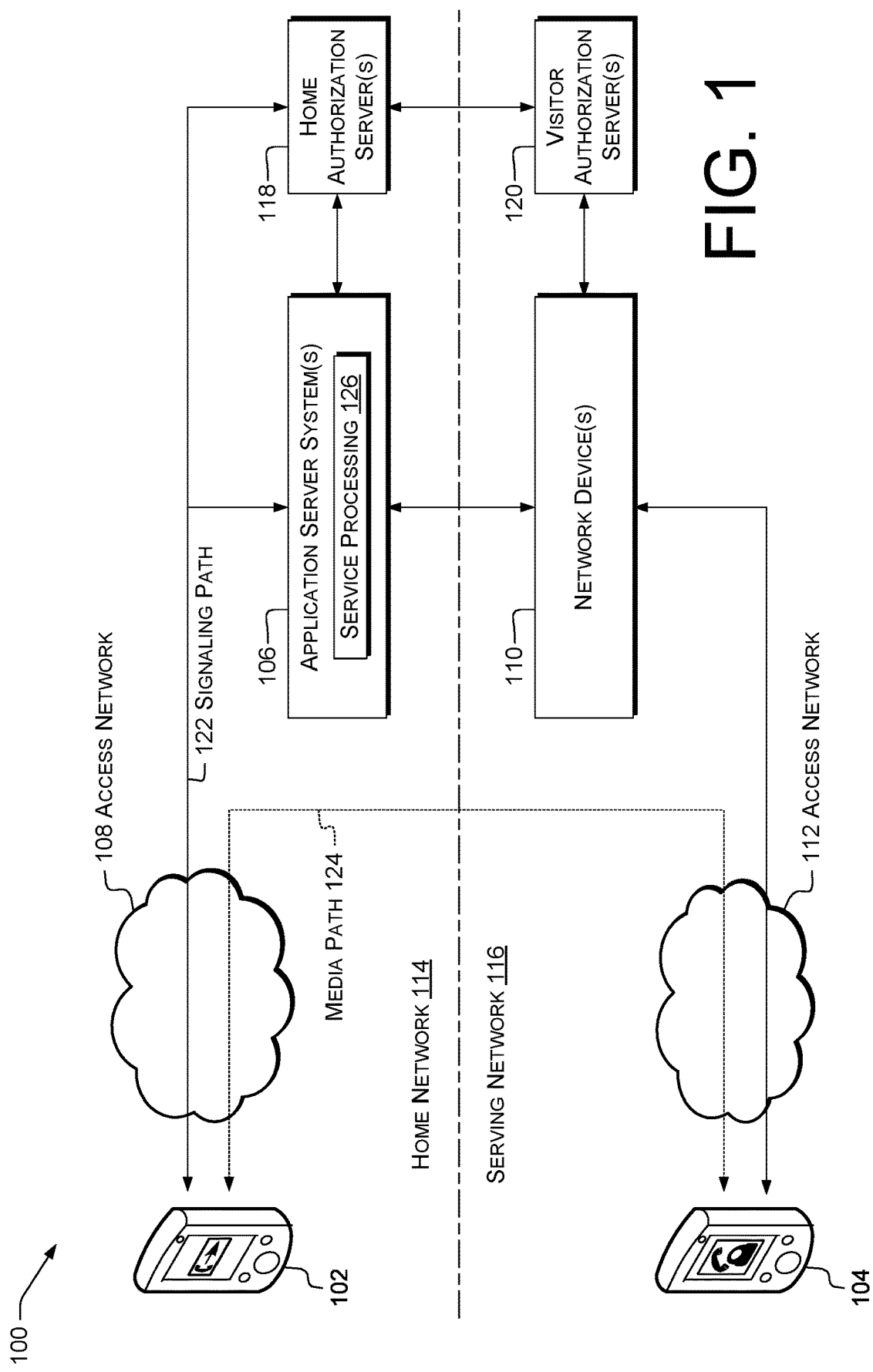
FIG. 1 is a block diagram illustrating a system for implementing network load reduction, e.g., by using an IP-based Lightweight Protocol, according to some implementations.

Table 1 presents definitions used in this application.

TABLE 1

| Term | Definition |
| --- | --- |
| Internet-Protocol-based Lightweight Protocol (IPLP) | An application-layer protocol that: runs over Internet Protocol (IP) (v4, v6, or a future version); and is separated from IP by at most one protocol layer, with the caveat that protocol-agnostic security sublayers such as TLS are counted as part of the application-layer protocol. |
| Wrapper protocol | A protocol running in a layer between the network layer and the application layer. |
| Structured text | Data that: is expressed in a human-readable character set (e.g., ASCII, ISO-8859-1, or any encoding of Unicode); includes at least two logically separate data values; and includes metadata distinguishing the at least two logically separate data values from each other. |

Examples of IPLPs include, but are not limited to, HyperText Transfer Protocol (HTTP), HTTPS (HTTP with Transport Layer Security, TLS), File Transfer Protocol (FTP), FTPS (FTP with TLS), Session Initiation Protocol (SIP), SIPS (SIP with TLS), Secure Shell (SSH), or future versions of any of those. IPLPs can run directly on IP, or can be separated by a single layer. For example, an IPLP can be separated from the IP layer by a Transmission Control Protocol (TCP), Stream Control Transmission Protocol (SCTP), or User Datagram Protocol (UDP) layer. The word "lightweight" is used only for convenience in referencing these protocols, and does not limit the complexity of the referenced protocols in any way.

Examples of wrapper protocols include TCP, SCTP, UDP, and SSH (when used for tunneling) on IP networks, and Signaling Connection Control Part (SCCP) and Transaction Capabilities Application Part (TCAP) on Signaling System 7 (SS7) networks.

Examples of structured text include, but are not limited to, JavaScript Object Notation (JSON), Extensible Markup Language (XML), Abstract Syntax Notation 1 (ASN.1)

encoded with the Generic String Encoding Rules (GSER), ASN.1 encoded with the JSON Encoding Rules (JER), ASN.1 encoded with the XML Encoding Rules (XER) (or variants such as Canonical XER or Extended XER), YAML ("YAML Ain't Markup Language"), or comma-separated value (CSV) (or variants using other separators, such as tab-separated, TSV). XER-encoded ASN.1 is also XML, and JER-encoded ASN.1 is also JSON.

As used herein, a message "transmitted to" or "transmitted toward" a destination, or similar terms, can be transmitted directly to the destination, or can be transmitted via one or more intermediate network devices to the destination. Those intermediate network devices can include application server system(s) 106 or network device(s) 110, FIG. 1. Similarly, a message "received from" a destination can be received directly from the destination, or can be received via one or more intermediate network devices from the destination. A message passing through one or more intermediate network devices can be modified by those network devices, e.g., by adding or removing framing, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Overview

Some example systems and techniques described herein permit reducing resource consumption or increasing call capacity within a core network. Some examples systems modify the encapsulation of data transmitted within a network by replacing higher-overhead wrapper protocols with lower-overhead wrapper protocols, or by reducing the number of wrapper protocols in use. Some examples perform this modification, e.g., when a VoLTE terminal places a call, e.g., to a CS terminal, or when a PS terminal performs a USSD request or another asynchronous data exchange.

In 3G networks, and 3G legacy subsystems in 4G networks, some messages between nodes belonging to the same carrier are transported via GSM Mobile Application Part (MAP) connections. Those connections wrap data in the GSM MAP protocol. The underlying transport may be physical SS7 links or IP transport using SIGTRAN (signaling transport over IP). However, the messages still incur the overhead of GSM MAP. In the case of SIGTRAN, the messages also incur the overhead of SIGTRAN itself, plus the TCAP protocol and possibly also the SCCP protocol. Examples of MAP messages include MAP-ANY-TIME-INTERROGATION (ATI, also referred to as anyTimeInterrogation) and MAP-SEND-ROUTING-INFORMATION (SRI, also referred to as sendRoutingInformation), as defined in, e.g., ETSI TS 129 002 V13.3.0 or any later version.

Furthermore, networks using GSM MAP transmissions require the communicating nodes be assigned SS7 point codes (network addresses) or global titles (GTs). SS7 point codes are limited to 24 bits in length in some countries, and to only 14 bits in length when crossing international borders. GTs are sometimes limited to 15 decimal digits, and must be assigned to operators that wish to use them. The limitation on the number of point codes or GTs available to an operator can inhibit expansion of an operator's network, preventing users from receiving telecommunication services.

Moreover, GSM MAP requires the home location register (HLR) to send at least one MAP provideRoamingNumber message to a visitor location register (VLR) when a terminal is roaming. These exchanges between the HLR and VLR consume network bandwidth. Similarly, GSM MAP exchanges between the TAS and the HLR, which trigger the HLR-VLR communications, consume network bandwidth.

In some examples herein, GSM MAP ATI and SRI messages between a telephony application server (TAS) and an HLR or VLR are replaced with HTTP transactions, e.g., according to a RESTful protocol specification. In some examples, GSM MAP USSD messages between a TAS and a USSD gateway are similarly replaced with HTTP transactions. This removes the overhead of SCCP and TCAP signaling, and provides more flexible access to the information transferred.

Table 2 shows a comparison of the protocol stack of some prior schemes with the protocol stack of at least one illustrative embodiment herein. Table 2 shows that, in the listed illustrative embodiment, the transport layer only involves one protocol, compared to the two or four transport-layer protocols used by some prior schemes.

TABLE 2

| OSI Level | MAP over SS7 | MAP over SIGTRAN | Illustrative Embodiment |
|---|---|---|---|
| Application | MAP | MAP | HTTP carrying MAP payload data |
| Presentation | | | |
| Session | | | |
| Transport | TCAP SCCP | TCAP SCCP M3UA SCTP | TCP |
| Network | MTP level 3 | IP | IP |
| Data-link | MTP level 2 | Ethernet, . . . | Ethernet, . . . |
| Physical | MTP level 1 | Ethernet PHY, . . . | Ethernet PHY, . . . |

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals. Other examples of terminals are discussed below.

The term "session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session. Sessions can be carried, e.g., by cellular or data networks, e.g., LTE or WIFI. Other examples of networks are discussed below.

A terminal in a mobile-radio system, e.g., an association of public land mobile networks (PLMNs), is associated with a home network that maintains authorization information for that terminal. A terminal can receive communication services from the home network (e.g., a home PLMN, HPLMN) or from a visited network (e.g., a visited PLMN, VPLMN) different from the home network. The term "roaming" describes operation of a terminal in a visited network. A "serving network" is an access network via which a terminal is receiving connectivity, regardless of whether that network is a home network or a visited network. Evolved SRVCC (eSRVCC) technology permits signaling and media to be anchored at an access transfer control function (ATCF) and an access transfer gateway (ATGW), respectively, of a serving network. The serving network can therefore isolate the home network from routing changes due to handover from PS to CS. This can reduce handover latency and increase performance.

These and other examples herein can reduce the overhead of MAP communications. This can reduce network load in the core of the network and so increase availability of network services. This can also permit supporting a higher number of concurrent sessions at a given quality of service (QoS).

Illustrative Configurations

FIG. 1 is a block diagram illustrating a telecommunication system 100, e.g., a telecommunications network, according to some examples. The system includes terminals 102 and 104, which can be operated, e.g., by respective users. Terminal 102 communicates with one or more application server system(s) 106, e.g., via access networks 108 such as an LTE network. The application server system(s) 106 can include, e.g., a TAS or SCCAS of an Internet Protocol (IP) Multimedia Subsystem (IMS) in a VoLTE-capable network. Terminal 104 communicates with network device(s) 110 via access network 112, e.g., a UMTS network. The network device(s) 110 can include, e.g., an MSS. The application server system(s) 106 or network device(s) 110 can be implemented as standalone device(s), or combined with other network functions into a single device or collection of device(s).

In the illustrated example, terminal 102 uses services located in, part of, or otherwise provided by, a home network 114, e.g., an HPLMN. Terminal 104 is roaming in, or otherwise connected to, a serving network 116, e.g., a VPLMN, having the access network 112. In some examples, serving network 116 can be or include a GSM or other SS7-connected network.

In some examples, home authorization server(s) 118 in home network 114 hold information associated with terminals 102 or 104, or other terminals associated with home network 114. Home authorization server(s) 118 can be implemented as standalone device(s), or combined with other network functions into a single device or collection of device(s). Home authorization server(s) 118 can include, e.g., a Diameter Routing Agent (DRA), an HLR, or a home subscriber server (HSS). Visitor authorization server(s) 120 in serving network 116, e.g., a VLR, can hold information about devices roaming in serving network 116. For brevity, visitor authorization server(s) 120 are referred to herein as VLR 120.

Once terminal 102 is authorized by home authorization server(s) 118 and attached to serving network 116, terminal 102 can participate in sessions. For example, terminal 102 can initiate a session with terminal 104 by exchanging messages via a signaling path 122. For example, terminal 102 can transmit a SIP INVITE message having a Session Description Protocol (SDP) body including a session description, or other session-initiation message. In some examples, the session-initiation message is not associated with a handover. Application server system(s) 106 or terminal 104 can, in response, transmit corresponding SIP response(s), e.g., a SIP 180 Ringing or 200 OK response. As used herein, a SIP response code ending in "xx", e.g., a SIP 1xx Provisional response, signifies any response of, e.g., class 1 of SIP responses (RFC 3261, § 7.2).

Session initiation can be performed, e.g., as defined in the GSM or VoLTE standards, and can include the exchange of additional messages (not shown) between the terminals 102 and 104 and the application server system(s) 106. Data of the session, such as audio data or video data, can be exchanged between terminals 102 and 104 via a media path 124. In some examples, media path 124 can pass through or involve one or more access or media gateway(s), omitted for brevity. Gateway(s) can be located in serving network 116 or home network 114, in any combination.

In some examples, messages along signaling path 122 can pass through anchoring network system(s) (omitted for brevity), e.g., a P-CSCF or an ATCF of an IMS. Anchoring network system(s) can be implemented as standalone device(s), or combined with other network functions into a single device or collection of device(s).

As used herein, an "anchoring network system" is a network function, embodied in a network device, through which at least some signaling traffic for a communication session, e.g., SIP traffic, passes for the duration of an established phase of the communication session. That session is "anchored" at the anchoring network device. Anchoring network systems can, e.g., operate as SIP proxies or back-to-back user agents (B2BUAs). Anchoring signaling traffic for a session can increase network robustness by isolating the two sides of the anchoring network device.

In some examples, e.g., as discussed herein with reference to FIGS. 2-12, application server system(s) 106 perform service processing 126. For example, terminal 102 may request a VoLTE call with terminal 104. Application server system(s) 106 can then determine that destination terminal 104 is in serving network 116. This can involve communications with home authorization server(s) 118 and, indirectly, with visitor authorization server(s) 120. Service processing 126 can include transmitting data via HTTP or another IPLP instead of GSM MAP, in some examples.

The terminals 102 and 104 may be implemented as any suitable computing or telecommunication devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 and 104 as being "mobile," (i.e., configured to be carried and moved around) it is to be appreciated that the terminals 102 and 104 may represent various types of communication devices that are generally stationary as well, such as televisions, desktop computers, game consoles, set top boxes, Internet of Things (IoT) devices such as fixed sensors that communicate via IP-based wireless networks, and the like. For example, IoT devices can transmit data via the network, e.g., 2-4 times per hour. Other IoT devices can include IoT network interface chips embedded in small electronic devices, appliances, or other devices; smart tags on boxes or other containers of medicine or other goods; or in-vehicle telemetry systems. In this sense, the terms "communication device," "wireless device," "wireline device," "mobile device," "computing device," "user equipment," and "UE" may be used interchangeably herein to describe any communication device capable of performing the techniques described herein. Terminals 102 and 104, e.g., user equipment, can include user cellular equipment or other telecommunications or computing devices communicatively connectable with other computing devices via one or more application server system(s) 106. Mobile phones and copper-loop landline phones can be examples of user equipment using wired (Plain Old Telephone Service, POTS, or PSTN) connections. Desktop computers and other wired devices can use copper or optical links such as Ethernet, Asynchronous Transfer Mode (ATM), or SONET (Synchronous Optical NETwork).

Furthermore, the terminals 102 and 104 may be capable of communicating over wired networks, and/or wirelessly using any suitable wireless communications/data technology, protocol, or standard. Examples include second-generation (2G) cellular networks such as GSM and third-generation (3G) cellular networks such as the Universal Mobile Telecommunications System (UMTS). Other example networks include fourth-generation (4G) cellular networks, such as LTE cellular networks carrying voice over LTE (VoLTE) sessions using SIP signaling, or the public switched telephone network (PSTN) using Signaling System 7 (SS7) signaling. An example is an Evolved Packet System (EPS) network including Evolved UMTS Terrestrial Radio Access Network (E-UTRAN) access and an Evolved Packet Core (EPC). Still other examples include data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport. GSM and the PSTN are examples of CS networks; LTE and WIFI are examples of PS networks. Other example networks can include Time Division Multiple Access (TDMA), Evolution-Data Optimized (EVDO), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), wireless microwave access (WIMAX), IEEE 802.15.1 (BLUETOOTH), and/or any future IP-based network technology or evolution of an existing IP-based network technology.

Figure 2:
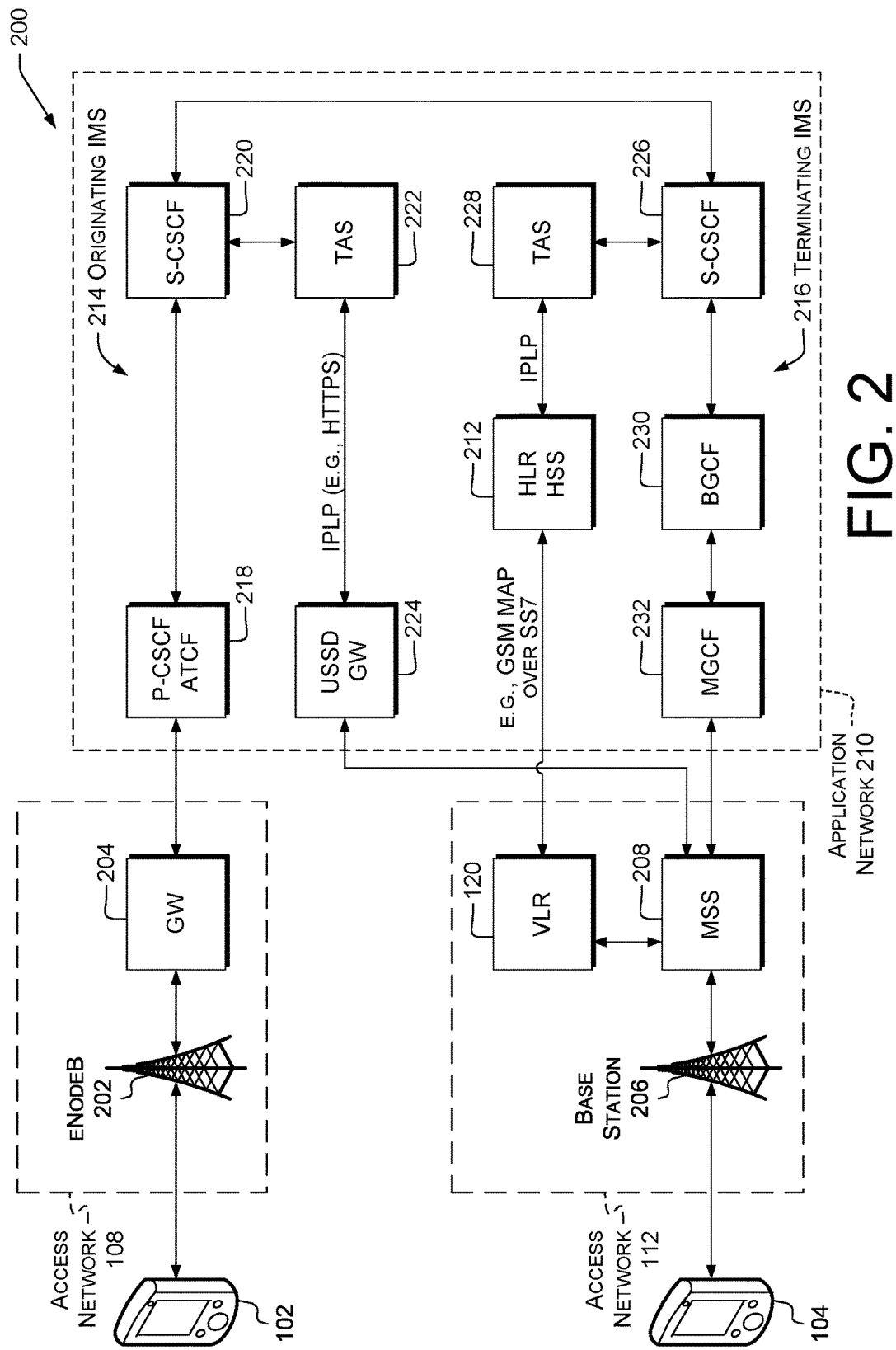
FIG. 2 illustrates an example telecommunications network, including components used to establish communication sessions or perform USSD data exchanges.

In some examples, at least one of serving network 116 or home network 114 can include a PS access network, e.g., as discussed herein with reference to FIG. 2. Additionally or alternatively, at least one of serving network 116 or home network 114 can include a local-area network (LAN)-based access network having a wireless access point (WAP), e.g., a WIFI WAP, and a bridge or other packet relay. Additionally or alternatively, at least one of serving network 116 or home network 114 can include a CS access network having a CS base station and a mobile switching center (MSC) server (MSS).

In some examples, the application server system(s) 106 can be entirely in serving network 116, entirely in home network 114, or at least one in each network 116, 114. In some examples, media gateway(s) can be entirely in serving network 116, entirely in home network 114, or at least one in each network 116, 114. In some examples, each of the application server system(s) 106 and media gateway(s) belongs to either the serving network 116 or the home network 114.

FIG. 2 illustrates an example telecommunications network 200. The illustrated blocks represent network functions that can be implemented as standalone device(s), or combined with other network functions into a single device or collection of device(s). For brevity, media path 124 and components thereon are not represented in FIG. 2. The devices and networks illustrated in FIG. 2 can be examples of the devices and networks illustrated in FIG. 1 and described above. Accordingly, the descriptions of the devices and networks of FIG. 1 apply to the devices and networks of FIG. 2. Some examples herein, e.g., in FIG. 2, and in FIGS. 4-12, below, are given in the context of an originating (MO) terminal. Corresponding techniques and structures can additionally or alternatively be used with terminating (MT) terminals.

Terminal 102 is attached to access network 108 of the telecommunications network 200, and terminal 104 is attached to access network 112. In the example of FIG. 2, access network 108 includes a PS access network, e.g., an EPS, and access network 112 includes a CS access network. PS access network 108 includes an eNodeB 202, e.g., a 4G base station or other access point, that provides connectivity to the PS access network 108. The eNodeB 202 is connected with a gateway 204 ("GW"), e.g., an LTE S-GW or P-GW. CS access network 112 includes a base station 206, e.g., a NodeB, and an MSS 208. In some examples, MSS 208 can be one of the network device(s) 110. CS access network 112 also includes visitor authorization server(s) 120, depicted as a VLR.

Access networks 108, 112 are communicatively connected with an application network 210, e.g., an IMS network or other network providing services to terminal 102. Application network 210 can also be referred to as an "upper-level" network that uses the services provided by access networks 108, 112 to communicate with terminals 102, 104. Application network 210 includes an HLR/HSS 212, which can be among, or otherwise represent, home authorization server system(s) 118. Other examples of home authorization server system(s) 118 can include, e.g., an equipment identity register (EIR), an enhanced EIR (EEIR), a DNS server, or an E.164 Number Mapping (ENUM) server. In some examples, such as that shown, HLR/HSS 212 can communicate via GSM MAP with VLR 120. Examples include roaming situations in which VLR 120 of serving network 116 does not support IPLP-based communication.

Application network 210 can include components of an originating IMS 214 (O-IMS) and a terminating IMS 216 (T-IMS). Either IMS is originating or terminating on a session-by-session basis; it is not required that either be wholly dedicated to origination or termination. O-IMS 214 can provide media-handling services to terminal 102, e.g., to route video or voice data or to maintain continuity of a communication session during handover of the communication session. O-IMS 214 can include a number of nodes, such as a proxy call session control function (P-CSCF) 218 (which can also represent an ATCF), a serving call session control function (S-CSCF) 220, a TAS 222 (originating TAS, O-TAS), and a USSD gateway (GW) 224. As used herein, a USSD GW is any device performing USSD functions described herein, whether implemented as a standalone device or not.

T-IMS 216 can include an S-CSCF 226, a TAS 228 (terminating, T-TAS), a BGCF 230, and an MGCF 232. TASes 222, 228 can be examples of application server(s) (ASes) and can represent application server system(s) 106. O-IMS 214 can additionally or alternatively include other components, e.g., additional ASes. In an example of session-control services, a SIP signaling path of a communication session can pass from terminal 102 through eNodeB 202, gateway 204, P-CSCF/ATCF 218, S-CSCF 220, O-TAS 222, back through S-CSCF 220, through S-CSCF 226, through T-TAS 228 and back to S-CSCF 226, BGCF 230, MGCF 232, MSS 208, and base station 206, to terminal 104, in that order. In some examples, such as that shown, TASes 222, 228 can communicate with USSD GW 224 and HLR/HSS 212, respectively, via an IPLP such as HTTPS.

The telecommunications network 200 may also include a number of devices or nodes not illustrated in FIG. 2. Such devices or nodes may include an ATGW, a serving GPRS support node (SGSN), a gateway GPRS support node (GGSN), a policy control rules function (PCRF) node, or a session border controller (SBC). O-IMS 214 may further include a number of devices or nodes not illustrated in FIG. 2, such as a presence server and one or more additional CSCFs.

The telecommunications network 200 may provide a variety of services to terminal 102, such as synchronous communication routing across a PSTN. Further services may include call control, switching, authentication, billing, etc. In at least one example, O-IMS 214 functions and devices communicate using specific services provided by the serving network 116 or elements thereof, but are not directly tied to those specific services. For example, O-IMS 214 devices can intercommunicate using an EPC network, a GSM network, a SONET network, or an Ethernet network.

Figure 3:
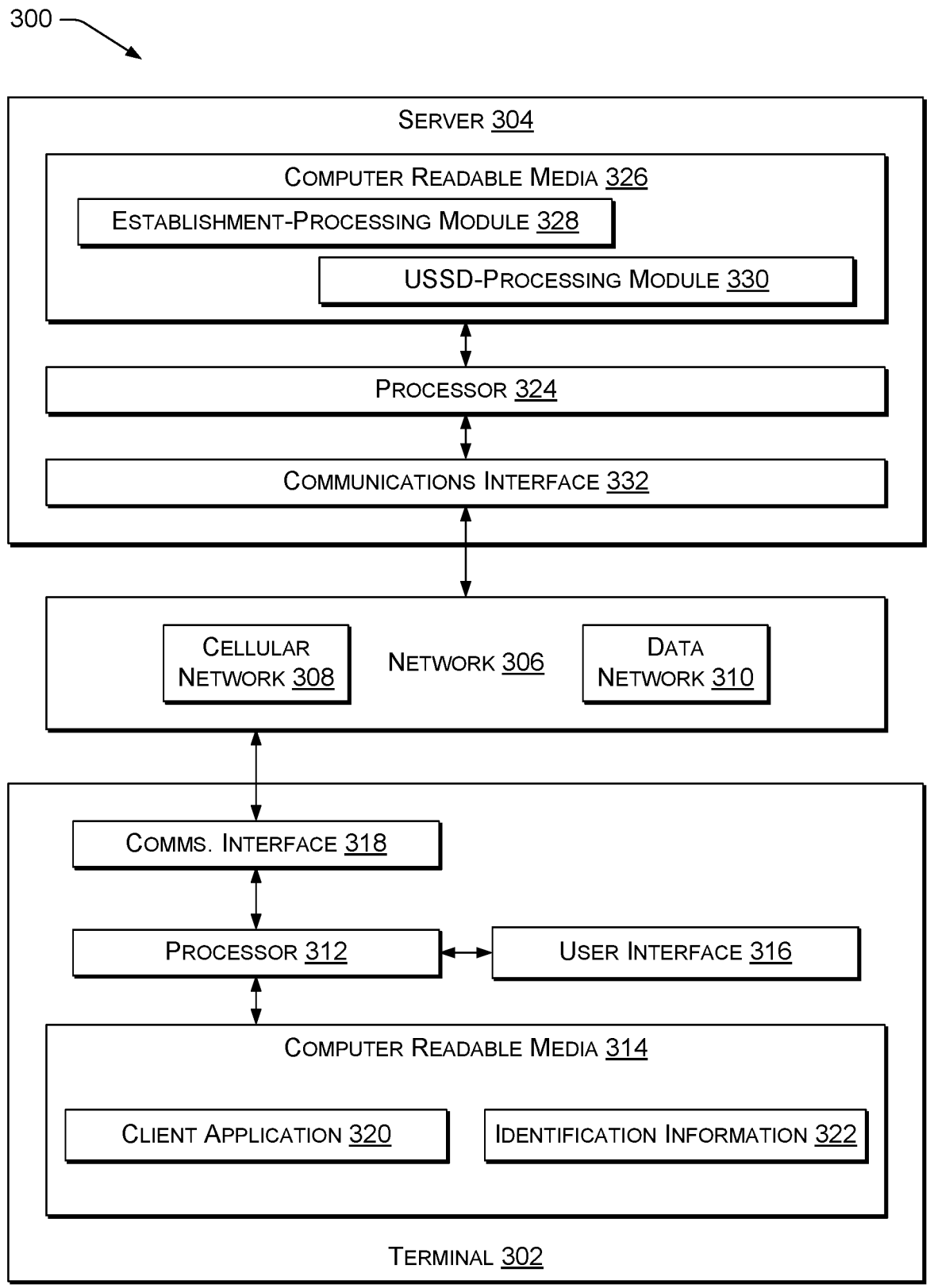
FIG. 3 is a block diagram illustrating a system that provides network-load reduction according to some implementations.

FIG. 3 is a block diagram illustrating a system 300 permitting network-load reduction with respect to terminals, e.g., roaming terminals, according to some implementations. The system 300 includes a terminal 302, e.g., a wireless phone or other terminal such as terminal 102 or 104, FIG. 1, or terminal 102, FIG. 2, coupled to a server 304 via a network 306. The server 304 can represent an application server system 106 (e.g., TAS 222 or 228) or another control system of a telecommunications network configured to perform functions described herein.

The network 306 can include one or more networks, such as a cellular network 308 and a data network 310. The network 306 can include one or more core network(s) connected to terminal(s) via one or more access network(s). Example network technologies are described above with reference to FIG. 1. For example, cellular network 308 can include an LTE or GSM network.

The data network 310 can include various types of networks for transmitting and receiving data (e.g., data packets), including networks using technologies such as WIFI, and other network technologies, e.g., configured to transport IP packets. In some examples, the server 304 includes or is communicatively connected with an interworking function (IWF) or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the voice-over-LTE (VoLTE) standard.

The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The terminal 302 can further include a user interface (UI) 316, e.g., including an electronic display device, a speaker, a vibration unit, a touchscreen, or other devices for presenting information to a user and receiving commands from the user. The terminal 302 can further include one or more communications interface(s) 318, e.g., radio(s) or other network interface(s), configured to selectively communicate (wired or wirelessly) via the network 306, e.g., via an access network 108 or 112.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program modules, or other data.

The CRM 314 can include processor-executable instructions of a client application 320. The client application 320, e.g., a native or other dialer, can permit a user to originate and terminate communication sessions, e.g., voice or USSD, associated with the terminal 302. The client application 320 can additionally or alternatively include an SMS, RCS, or presence client, or a client of another telephony service offered by the server 304.

The CRM 314 can store service identification information 322 identifying the terminal 302. The identification information 322 can include, e.g., an IMEI, an IMSI identifying the subscriber using terminal 302, or other information discussed herein, e.g., with reference to block 402. The CRM 314 can additionally or alternatively store credentials (omitted for brevity) used for access, e.g., to IMS or RCS services.

The server 304 can include one or more processors 324 and one or more CRM 326. The CRM 326 can be used to store processor-executable instructions of an establishment-processing module 328 or a USSD-processing module 330. The processor-executable instructions of module 328 or 330 can be executed by the one or more processors 324 to perform various functions described herein, e.g., service processing 126. In some examples, server 304 can be configured to, e.g., by executing the processor-executable instructions, perform functions described herein with reference to FIGS. 4-12.

In some examples, server 304 can communicate with (e.g., is communicatively connectable with) terminal 302 or other devices via one or more communications interface(s) 332, e.g., network transceivers for wired or wireless networks, or memory interfaces. Example communications interface(s) 332 can include Ethernet or FIBRE CHANNEL transceivers, WIFI radios, or DDR memory-bus controllers (e.g., for DMA transfers to a network card installed in a physical server 304). Communications interface(s) 318 can include any of the components described in this paragraph.

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 324 with, if required, CRM 326.

Illustrative Operations and Messages

Figure 4:
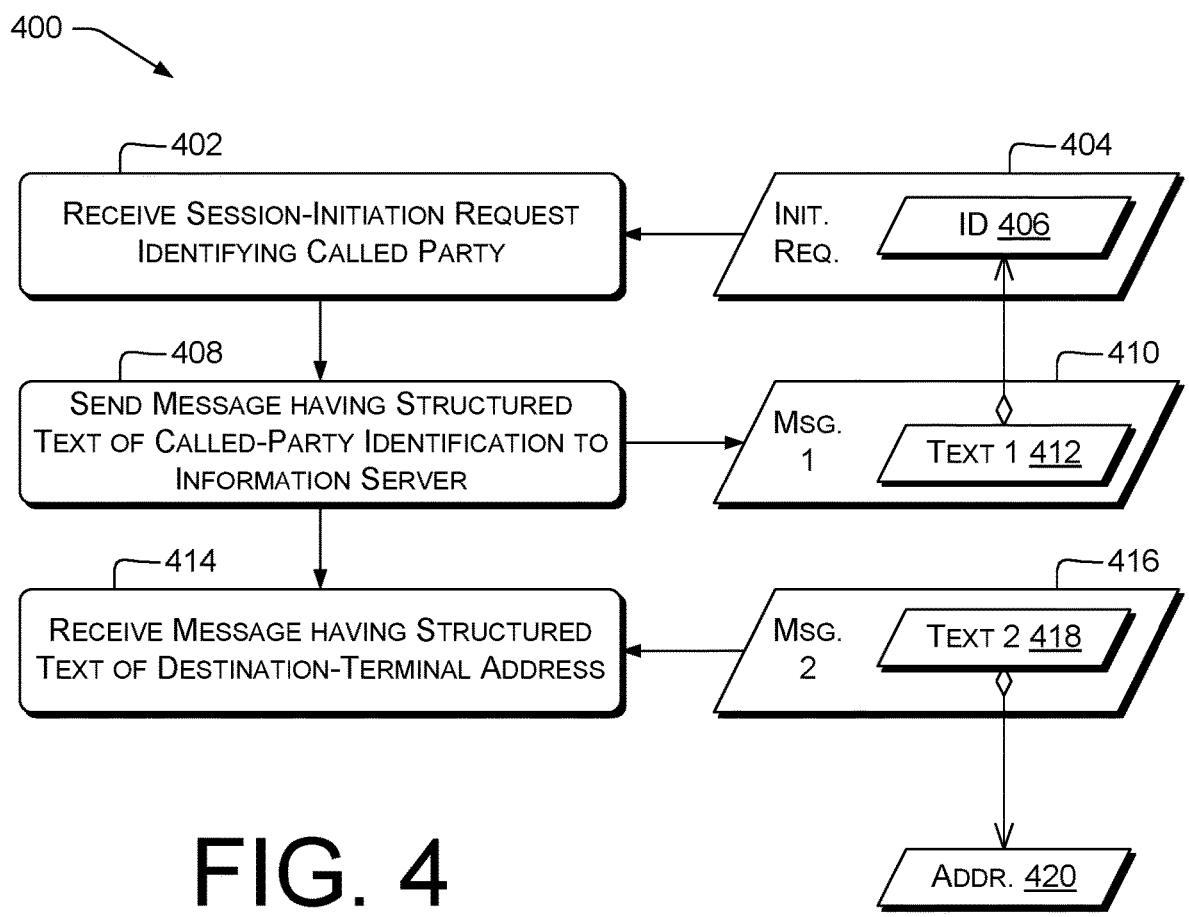
FIG. 4 illustrates an example process for establishing a session, according to some implementations.

FIG. 4 is a dataflow diagram illustrating an example process 400 for establishing sessions such as voice calls, and related data items. Process 400 can be performed, e.g., by an application server system 106 of a telecommunications network, e.g., a TAS 228 or other server 304. The server 304 can communicate with user equipment, e.g., terminal 102, 104, or 302, of telecommunications network 306. In some examples, the server 304 includes a control unit configured to perform operations described below, e.g., in response to computer program instructions of the establishment-processing module 328.

Operations shown in FIG. 4 and in FIG. 5-7 or 9-11, discussed below, can be performed in any order except when otherwise specified, or when data from an earlier step is used in a later step. For clarity of explanation, reference is herein made to various components shown in FIGS. 1-3 that can carry out or participate in the steps of the exemplary method, and to various operations and messages shown in FIGS. 8 and 12 that can occur while the exemplary method is carried out or as part of the exemplary method. It should be noted, however, that other components can be used; that is, exemplary method(s) shown in FIGS. 4-7 and 9-11 are not limited to being carried out by the identified components, and are not limited to including the identified operations or messages.

At 402, the control unit can receive, from an originating terminal 102, a session-initiation request 404 comprising an identification 406 of a called party. As noted above, the control unit can receive the session-initiation request 404 directly, or via PCSCF/ATCF 218, S-CSCF 220, and S-CSCF 226. The session-initiation request 404 can include a SIP INVITE request. In some example, identification 406 can include information provided by terminal 104 from its identification information 322 stored in its CRM 314.

In some examples, the identification 406 can include at least one of: a terminal identifier such as an international mobile equipment identity (IMEI), a network identifier such as a mobile country code (MCC) and a mobile network code (MNC), a user identifier such as an international mobile subscriber identity (IMSI) (which can include an MCC and an MNC), a user address such as an E.164 international-dialing-plan telephone number, mobile station international subscriber directory number (MSISDN), a network address, such as an Internet IPv4 or IPv6 address, or a country code, e.g., indicating a country in which terminal 102 is located. In some examples, the identification information can include an identifier of a Mobile virtual network operator (MVNO) determined from the IMSI of terminal 102.

At 408, the control unit can send, to an information server (e.g., an HLR/HSS 212), a first message 410 comprising first structured text 412. The first structured text 412 can include the identification 406 of the called party. For example, the first message 410 can be or include an ATI query or an SRI query. The identification 406 can be an MSISDN of the subscriber associated with terminal 104.

In some examples, the first structured text 412 includes a textual representation of data of a GSM MAP ATI query payload. Some of these examples include representations of data values from the payload, but not the MAP, TCAP, and SCCP framing of those values that would be used in an SS7-based network. Using the same underlying data values simplifies interworking with existing MAP-based equipment.

In some examples, the textual representation is a decimal or hexadecimal ("hex") conversion of numeric or binary-coded decimal (BCD) data. For example, the digit sequence {2, 4} can be represented in BCD as the byte 0x42 (0b0100'0010) (little-endian within the byte) in a GSM MAP payload. The same digit sequence can be represented as two ASCII characters with the byte sequence {0x32, 0x44} ("24"), or with the textual string "{2, 4}" (6 bytes in ASCII). In another example, the number 4919 can be represented in a GSM MAP payload with the two bytes {0x13, 0x37} (big-endian). The textual representation of such a value can be the four ASCII characters "4919" in decimal, the four ASCII characters "1337" in hex, or the six ASCII characters "0x1337" in hex with the base indicator "0x".

At 414, after block 408, the control unit can receive, from the information server, a second message 416 comprising second structured text 418. For example, the second message 416 can be an SRI reply. The second structured text 418 can include a destination-terminal address 420, e.g., a MAP roamingNumber, also referred to as a Mobile Station Roaming Number (MSRN). The destination-terminal address 420 can be an address that is dynamically bound to terminal 104 associated with the called party, e.g., by virtue of data stored in VLR 120 recording an association between the destination-terminal address 420 and the MSISDN of the called party, the IMEI of terminal 104, or other identifying information associated with terminal 104.

In some examples, the second structured text 418 comprises a textual representation of data of a GSM MAP SRI reply payload. The textual representation can be, e.g., as described above with reference to the first structured text 412.

In some examples, block 408 can include sending the first message 410 via an Internet-Protocol-based Lightweight Protocol (IPLP), e.g., at least one of: HyperText Transfer Protocol (HTTP) or HTTP+Transport Layer Security (HTTPS). In some examples, block 414 can include receiving the second message 416 via the IPLP. Using IPLPs to exchange messages can reduce the number of wrapper protocols required, increasing network efficiency.

In some examples, HTTP or HTTPS transfers can use the GET or POST methods. In some examples, the information server provides a Representational State Transfer (REST)-compliant Application Programming Interface (API). For example, message 410 can include a GET request to "/get-routing-number" with a query-string including the MSISDN of the called party or other identification 406, or a URL-encoded representation thereof. A URL including a query string can be an example of first structured text 412. The information server can respond to the GET request with message 416 including a 200 OK result code and an HTTP/HTTPS body holding the second structured text 418. In some examples, the information server can respond to queries from any authorized node capable of communicating with the information server via IP. This can be a much larger number of nodes than the number of nodes connected to the SS7 network. As a result, the information server can serve more nodes, which may reduce the number of nodes required in the network, reducing complexity and power consumption.

In some examples, at least one of, or both of, the first structured text 412 and the second structured text 418 can comprise at least one of: JavaScript Object Notation (JSON) or Extensible Markup Language (XML). Using structured text formats such as these, or others described above, can permit readily parsing and producing messages 410, 416, and can provide flexibility for future changes in the types of fields included in messages 410, 416.

In some examples, messages 410 and 416 comprise a complete request/reply pair that replaces both the GSM MAP ATI query/reply pair and the GSM MAP SRI query/reply pair. One of these examples, using HTTP/HTTPS-based messages, is shown in Table 3. In Table 3, the control unit provides the MSISDN of the called party in message 410. The information server provides the roamingNumber (encoded MSRN) of the called party in message 416. The "Address digits" in message 416 are the decoded MSRN. The control unit can prefix "tel:+" to the address digits to form a tel URL that can be used as the address in a SIP INVITE (in the example of Table 3, "tel:+14386852291").

structured text 508. The third structured text 508 can include an address of a location registry, e.g., a vlr-number of VLR 120.

At 510, the control unit can send, to the information server (e.g., HLR/HSS 212), a fourth message 512, e.g., an SRI query, comprising fourth structured text 514. In some examples, the fourth structured text 514 comprises the identification 406 of the called party. In other examples, fourth message 512 can be sent without structured text such as fourth structured text 514, and with an indication of the identification information in a header, binary message body, or other field.

Some examples using messages 506 and 512 do not combine the ATI and the SRI. In these examples, messages 410 and 506 are the ATI query and reply, respectively, and messages 512 and 416 are the SRI query and reply, respectively. In some examples, messages 410, 416, 506, and 512 can include representations of data from other GSM MAP messages, or from messages from SCCP-User protocols other than MAP.

At 516, the control unit can send, to a core network device such as terminating S-CSCF 226, a second session-initiation request 518, e.g., a SIP INVITE request, comprising the

TABLE 3

| Message 410 | Message 416 |
| --- | --- |
| GET /get-routing-number<br>Content-Type: application/json<br>"sessInformation": {<br>  "msisdn": "3608201946",<br>  "gsmSCF-Address": "912160132321f2",<br>  "sesscase": "term",<br>  "serviceName": "roaming",<br>  "senderAddressURL":<br>    "http://example.com:9080/bach"<br>} | 200 OK<br>Content-Type: application/json<br>"reply": {<br>  "vlr-number": "912160138350f9",<br>  "locationNumber": "8497216013835009",<br>  "cellGlobalIdOrServiceAreaIdFixedLength":<br>    "13001313ec0029",<br>  "imsi": "13300199005046f7",<br>  "TBCD digits": "310310990005647",<br>  "roamingNumber": "914183862592f1",<br>  "Address digits": "14386852291",<br>} |

Figure 5:
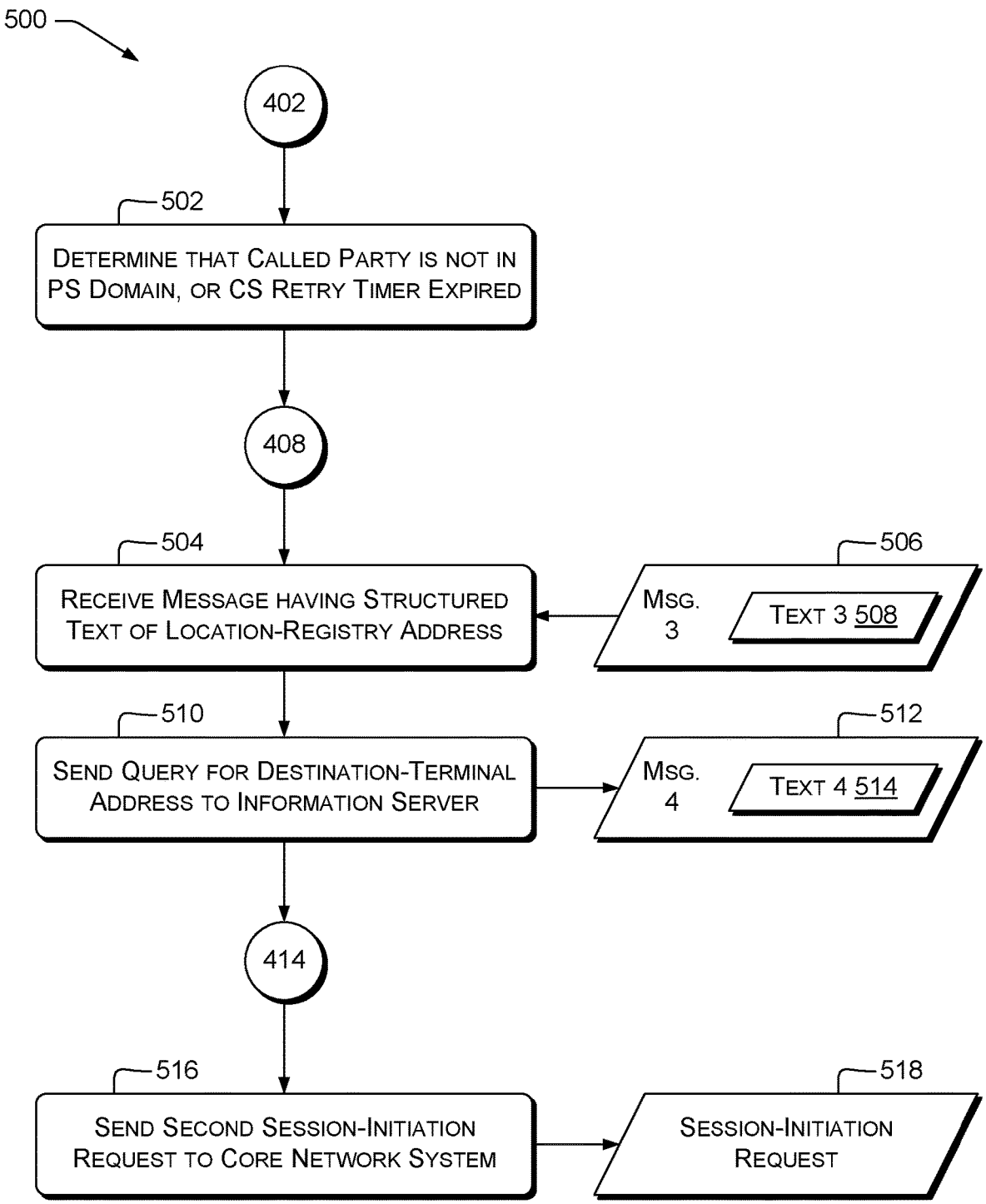
FIG. 5 illustrates an example process for retrieving information for session establishment, according to some implementations.

FIG. 5 is a dataflow diagram illustrating an example process 500 for establishing sessions, and related data items. Process 500 can be performed, e.g., by a control unit of, e.g., the server 304, FIG. 3. In some examples, block 402 is followed by block 502. In some examples, block 408 is followed by blocks 504 and 510, and block 510 is followed by block 414. In this way, blocks 504 and 510 are performed after sending the first message 410 and before receiving the second message 416. In some examples, block 414 is followed by block 516.

At 502, the control unit can determine that at least: the called party (identified in session-initiation request 404) is not attached to a packet-switched (PS) domain; or a circuit-switched retry timer has expired. In response, the control unit can perform block 408. If the called party is attached to a PS domain, and the CS retry timer has not expired, processing can terminate after block 502. This can reduce use of network resources when they are not required.

In some examples, block 502 can include performing, by TAS 228, a TADS query over the Diameter message UDR (User Data Request). The TADS query can provide information about whether terminal 104 is in a PS domain (query result 1), a CS domain (0), or an unknown domain (2). Block 408 can be performed in response to query results 1, or query result=1 together with expiration of the CS Retry timer.

At 504, the control unit can receive a third message 506, e.g., an ATI reply. The third message 506 can include third destination-terminal address 420 received in the second structured text 418. For example, if the destination-terminal address 420 is +14386852291, the second session-initiation request 518 can be addressed to the URL "tel:+14386852291".

Figure 6:
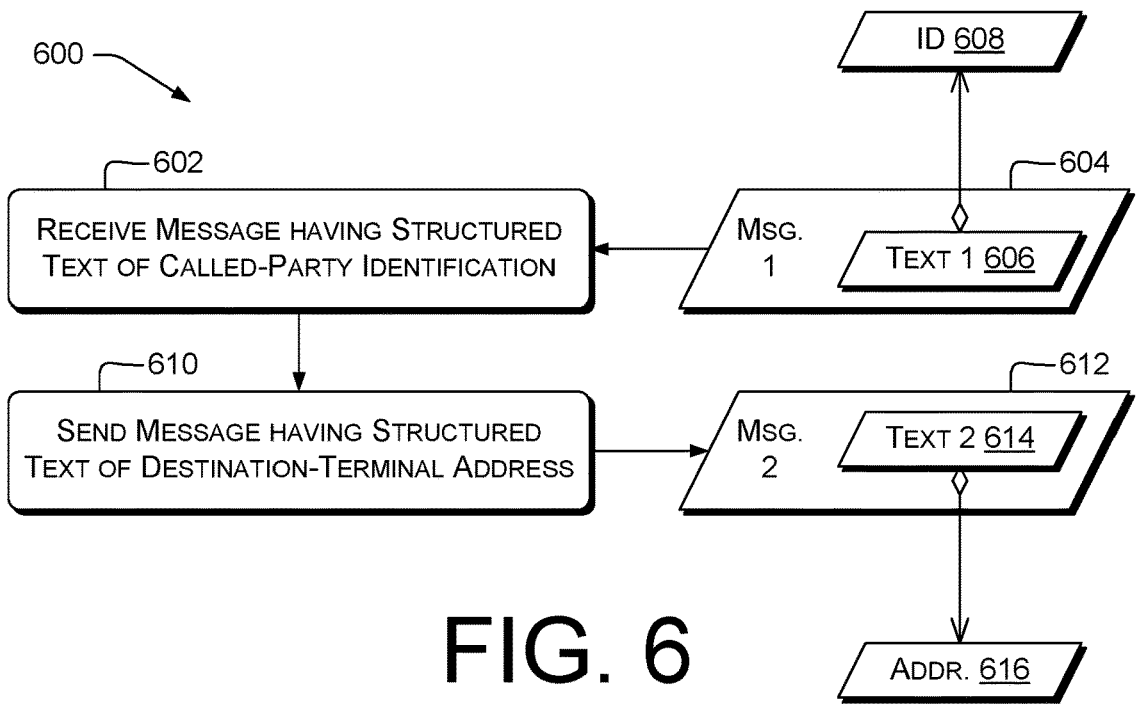
FIG. 6 illustrates an example process for providing information for session establishment, according to some implementations.

FIG. 6 is a dataflow diagram illustrating an example process 600 for controlling access to a network, and related data items. Process 600 can be performed, e.g., by a network node of home network 114, e.g., an HLR/HSS 212 of T-IMS 216, or another server 304, FIG. 3. The network node can include a control unit. For example, the network node can include one or more processors (e.g., processor 324) configured to perform operations described below, e.g., in response to computer program instructions of establishment-processing module 328 stored in at least one CRM 326.

At 602, the control unit can receive a first message 604 comprising first structured text 606, wherein the first structured text 606 comprises an identification 608 of a called party of a communication session. Examples are discussed herein, e.g., with reference to identification 406, first message 410, and first structured text 412. For example, the control unit can receive the first message 604 via an Internet-Protocol-based Lightweight Protocol (IPLP), such as at least one of HTTP or HTTPS.

In some examples, the first structured text 606 can include at least one of JSON or XML. In some examples, the first structured text 606 can include a textual representation of data of a GSM MAP ATI query payload or a GSM MAP SRI payload, e.g., values from such a payload, but not the SS7-based framing of those values. Examples are discussed herein, e.g., with reference to first structured text 412, FIG. 4.

At 610, the control unit can, in response, send a second message 612 comprising second structured text 614. The second structured text 614 can include a destination-terminal address 616 such as a MAP roamingNumber, or other data of a GSM MAP SRI reply (though, as noted, not the SS7 framing of that data). The destination-terminal address 616 can be dynamically bound, e.g., by data stored in VLR 120 of access network 112, to terminal 104 associated with the called party. Examples are discussed herein, e.g., with reference to second message 416 and second structured text 418. For example, the control unit can transmit the second message 612 via the IPLP.

In some examples, the second structured text 614 can include at least one of JSON or XML. In some examples, the second structured text 614 can include a textual representation of data of a GSM MAP SRI reply payload. Examples are discussed herein, e.g., with reference to second structured text 418, FIG. 4.

Figure 7:
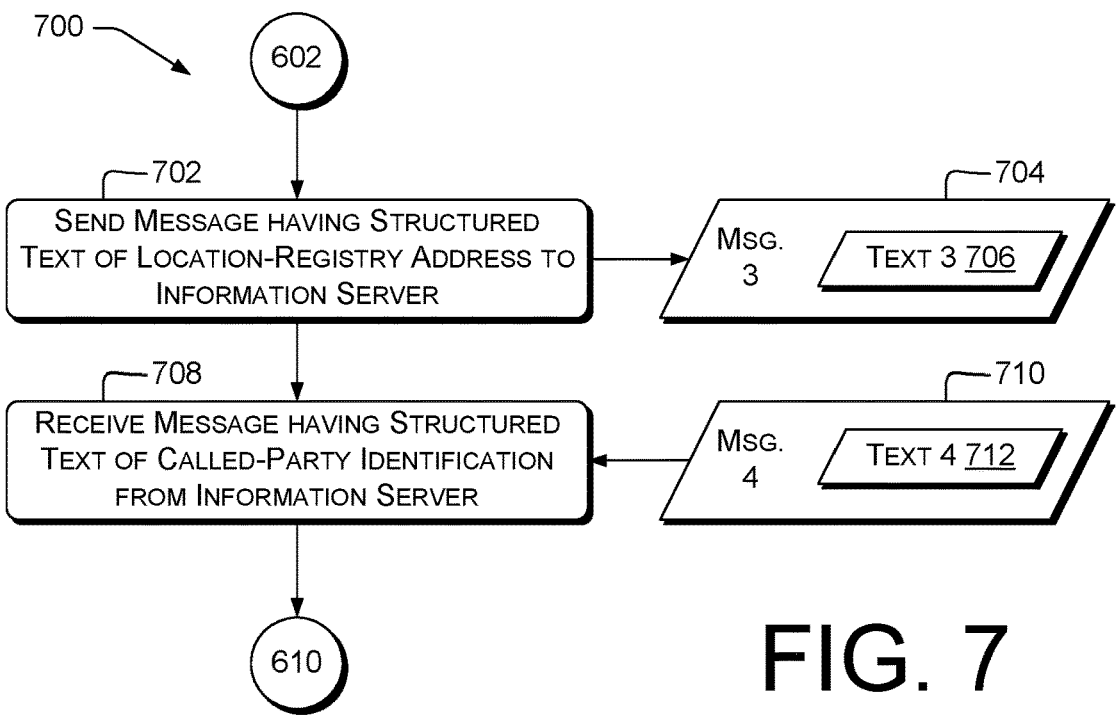
FIG. 7 illustrates an example process for providing information for session establishment, according to some implementations.

FIG. 7 is a dataflow diagram illustrating an example process 700 for establishing sessions, and related data items. Process 700 can be performed, e.g., by a control unit of, e.g., an HLR/HSS 212 or other server 304, FIG. 3. In some examples, block 602 can be followed by blocks 702 and 708, in that order, and block 708 can be followed by block 610. In this way, blocks 702 and 708 can be performed after receiving the first message 604 and before sending the second message 612.

At 702, the control unit can send a third message 704, e.g., an ATI reply, comprising third structured text 706. The third structured text 706 can include an address of a location registry. Examples are discussed herein, e.g., with reference to block 504.

At 708, the control unit can receive a fourth message 710, e.g., an SRI query, comprising fourth structured text 712. The fourth structured text 712 can include the identification 608 of the called party. Examples are discussed herein, e.g., with reference to block 510.

Figure 8:
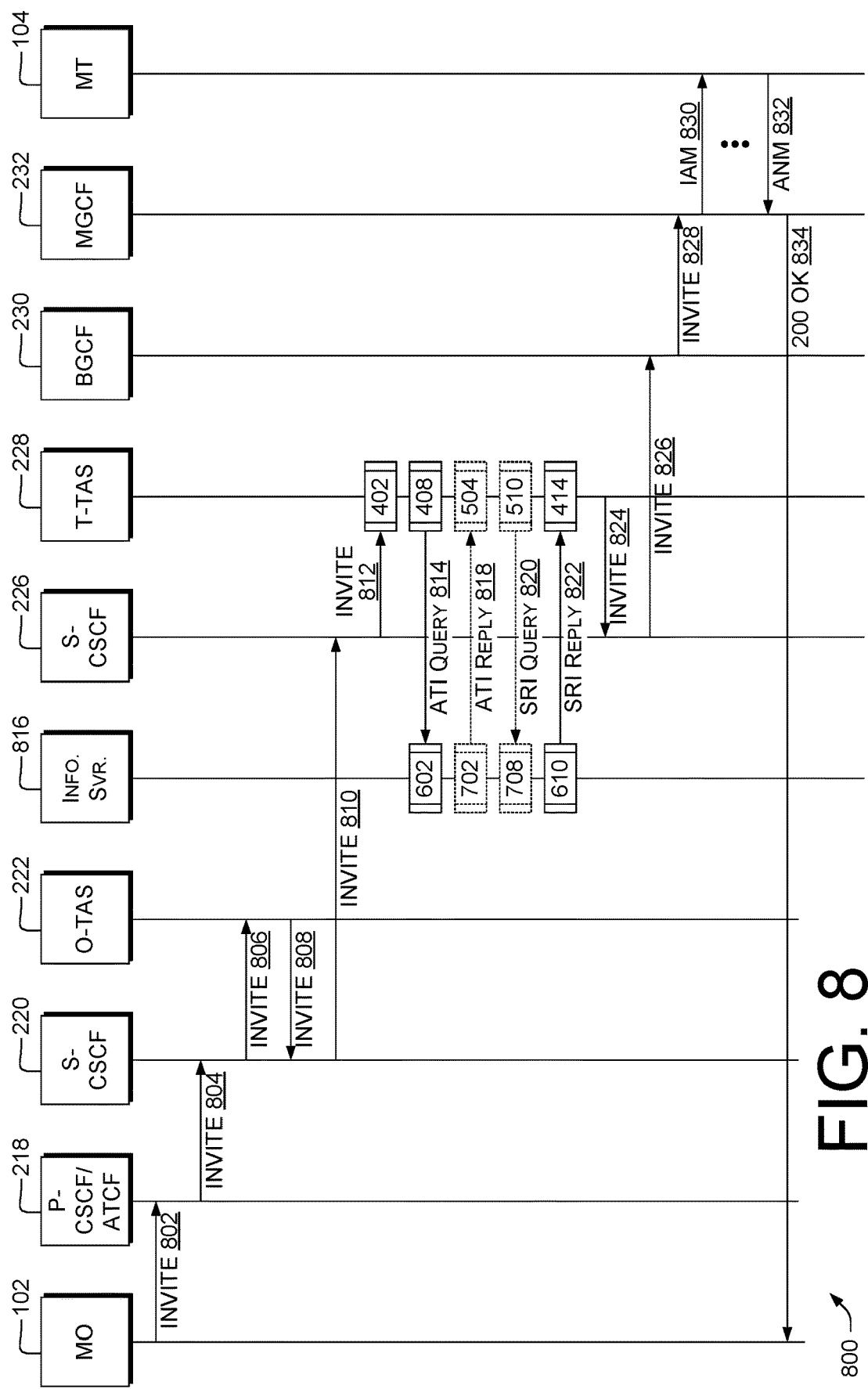
FIG. 8 is a call flow showing establishment of a session between a PS terminal and a CS terminal, according to some implementations.

FIG. 8 shows a call flow 800 illustrating an example of establishing a session. Flow 800 is shown with respect to an LTE originating terminal ("MO") 102 and a 3G destination terminal ("MT") 104. However, the flow can additionally or alternatively be used for sessions between devices on other types of networks. Reference is made to operations depicted in FIGS. 4-7 that can process transmission or receipt of the depicted messages. However, other operations can be used to process these messages.

Session establishment begins with an INVITE 802 from terminal 102. P-CSCF/ATCF 218 forwards INVITE 804 to S-CSCF 220, which forwards INVITE 806 to O-TAS 222. O-TAS 222 transmits INVITE 808 back to S-CSCF 220 for transmission to the terminating S-CSCF 226 as INVITE 810. S-CSCF 226 forwards INVITE 812 to T-TAS 228. T-TAS 228 can receive INVITE 812, which can represent session-initiation request 404, at block 402.

T-TAS 228 can transmit, at block 408, ATI query 814. ATI query 814 can represent first message 410 or 604. Information server 816 can receive ATI query 814 at block 602. Information server 816 can represent a home authorization server 118 such as an HLR/HSS 212, a visitor authorization server such as VLR 120, or another device peforming those functions (e.g., a co-located MSS/MGCF/VLR). Information server 816 can then respond, at block 702, with an ATI reply 818, which can represent third message 506 or 704. T-TAS 228 can receive ATI reply 818 at block 504.

T-TAS can then send, at block 510, SRI query 820, which can represent fourth message 512, 710. Information server 816 can receive SRI query 820 at block 708. Information server 816 can, in response, send SRI reply 822 at block 610. T-TAS 228 can receive SRI reply 822 at block 414. As discussed above, in other examples, ATI reply 818 and SRI query 820 are not used, or are combined with SRI reply 822 and ATI query 814, respectively. This is indicated by the dashed lines used for ATI reply 818 and SRI query 820.

In some examples, information server 816 can include an HLR/HSS 212 communicatively connectable with VLR 120. In response to ATI query 814, HLR/HSS 212 can transmit a provideSubscriberInfo query to VLR 120. HLR/HSS 212 can then receive a provideSubscriberInfo reply from VLR 120 and prepare ATI reply 818 based at least in part on the provideSubscriberInfo reply. Similarly, in response to SRI query 820, HLR/HSS 212 can transmit a provideRoamingNumber query to VLR 120. HLR/HSS 212 can receive a provideRoamingNumber result from VLR 120 and determine SRI reply 822 based at least in part on the provideRoamingNumber result. As noted above with reference to Table 3, ATI query 814 and SRI query 820 can be combined into a single request message, and ATI reply 818 and SRI reply 822 can be combined into a single reply message. Additionally or alternatively, SRI query 822 (or a combined ATI query 814, such as in Table 3) can be used together with SRI reply 822, and ATI reply 818 can be omitted.

In some examples, T-TAS 228 can incorporate information from ATI reply 818 into the CDR (Call Data Record) for charging purposes. For example, T-TAS 228 can use the "vlr-number" information in ATI reply 818 to determine whether terminal 102 is roaming or is being served by home network 114, and mark the charging record appropriately. In some examples, T-TAS 228 can use number-portability information or location information from ATI reply 818 in determining how to handle INVITE 812. In some examples, T-TAS 228 can use the "roamingNumber" information in SRI reply 822 to route the call towards terminal 104.

In some examples, SRI query 820 is not dependent on information from ATI reply 818. Therefore, SRI query 820 and ATI query 814 can be transmitted in parallel or in either order. Similarly, provideSubscriberInfo and provideRoamingNumber requests can be performed in parallel or in either order. For example, HLR/HSS 212 can prepare the provideRoamingNumber query without incorporating information from the provideSubscriberInfo reply into the provideRoamingNumber query. Examples of these queries and responses are given in Table 4.

TABLE 4

| ATI query 814 | ATI reply 818 |
|---|---|
| GET /endpoint | 200 OK |
| Content-Type: application.json | Content-Type: application/json |
| "ATI_Query": { | "ATI_response": { |

TABLE 4-continued

| | |
|---|---|
| "msisdn": "913106281049f6", | "vlr-number": "913106281049f6", |
| "Address digits": "13608201946", | "Address digits": "12063138059", |
| "requestedDomain": "cs-Domain (0)", | "locationNumber": "8497216013835009", |
| "gsmSCF-Address": "912160132321f2", | "Address digits": "79120631380590", |
| "Address digits": "12063132122" | "cellGlobalIdOrServiceAreaIdFixedLength": |
| "senderAddressURL": | "13001313ec0029" |
| "http://example.com:9080/oldfield" | } |
| } | |
| SRI query 820 | SRI reply 822 |
| GET /endpoint | 200 OK |
| Content-Type: application.json | Content-Type: application/json |
| "SRI_Query": { | "SRI_response": { |
| "msisdn": "913106281049f6", | "imsi": "13300199005046f7", |
| "Address digits": "13608201946", | "TBCD digits": "310310990005647", |
| "interrogationType": "basicCall (0)", | "roamingNumber": "914183862592f1", |
| "gsmSCF-Address": "912160132321f2", | "Address digits": "14386852291", |
| "Address digits": "12063132122" | } |
| "callReferenceNumber": "34303133" | |
| "senderAddressURL": | |
| "http://example.com:9080" | |
| } | |

Once T-TAS 228 has received SRI reply 822 including the roamingNumber or other destination-terminal address 420, 616, T-TAS 228 can send INVITE 824 referencing that destination-terminal address 420, 616 to S-CSCF 226 for forwarding as INVITE 826 to BGCF 230. BGCF 230 can send INVITE 828 to MGCF 232. MGCF 232 can, in turn, send an SS7 ISDN User Part (IUP) Initial Address Message (IAM) 830 to terminal 104 (or an SS7 node associated with terminal 104, e.g., MSS 208). MGCF 232 and terminal 104 can exchange other IUP messages (omitted for brevity) over SS7 links, concluding with an Answer Message (ANM) 832. In response to the ANM 832, MGCF 232 can send a SIP 200 OK reply 834 to terminal 102. Reply 834 can be carried as multiple SIP 200 OK replies, mirroring the INVITEs 802-812 and 824-828. Other SIP messages (omitted for brevity) can also be exchanged, e.g., as in the 3GPP VoLTE-to-3G call flow. Examples include SIP 183 Session in Progress and SIP 180 Ringing.

Further Illustrative Operations and Messages

Figure 9:
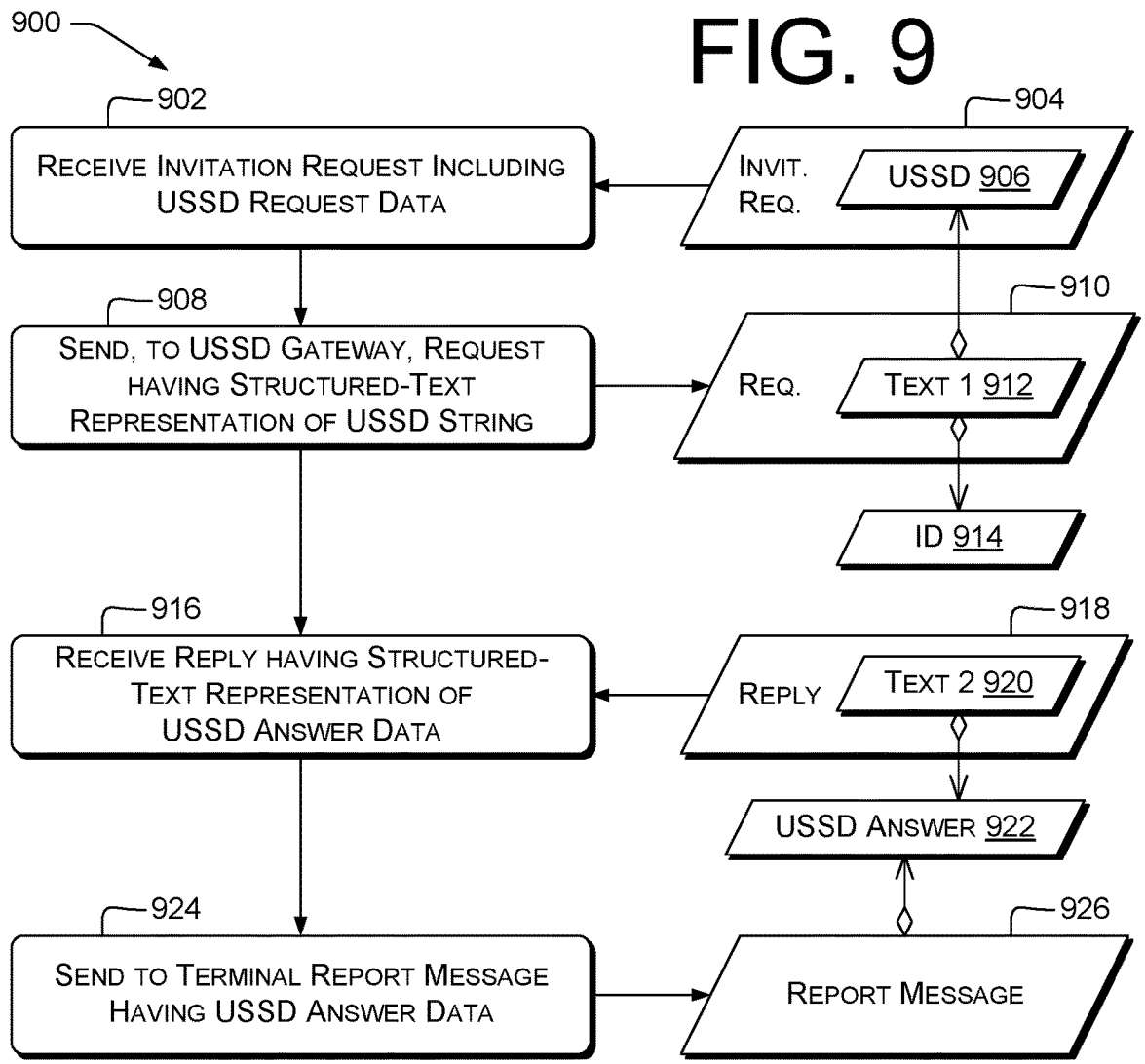
FIG. 9 illustrates an example process at a TAS or other core network device for requesting USSD information, according to some implementations.

FIG. 9 is a dataflow diagram illustrating an example process 900 for processing USSD requests, and related data items. Process 900 can be performed, e.g., by a network node of home network 114, e.g., a TAS 222, 228 communicatively connectable with a terminal 102 and with a USSD GW 224 of a telecommunications network, or by another server 304, FIG. 3. The network node can include a control unit. For example, the network node can include one or more processors (e.g., processor 324) configured to perform operations described below, e.g., in response to computer program instructions of USSD-processing module 330 stored in at least one CRM 326. For brevity, without limitation, examples herein are described with reference to O-IMS 214 and components thereof.

At 902, the control unit can receive, from the terminal 102, an invitation request 904 comprising USSD request data 906. The USSD request data 906 can include, e.g., a string of digits or symbols dialed on a phone keypad. An example is "#686#" ("# NUM #" on a U.S. standard phone keypad). A user can dial "#686#" on terminal 102 to request the phone number (MSISDN) of the subscriber associated with terminal 102. For example, the invitation request can include a Session Initiation Protocol (SIP) INVITE request.

At 908, the control unit can send to the USSD GW 224 a request 910 comprising first structured text 912 indicating the USSD request data 906 and an identifier 914 of the terminal 102. The control unit can send the request via an Internet-Protocol-based Lightweight Protocol (IPLP), which can include at least HTTP, HTTPS, or other options described herein with reference to Table 1 or block 408. The first structured text 912 can include at least one of JSON or XML.

At 916, the control unit can receive, from the USSD GW 224 in response to the request, a reply 918 including second structured text 920. The control unit can receive the reply 918 via the IPLP. The second structured text can represent USSD answer data 922, e.g., by including a textual representation of the USSD answer data 922. Examples of textual representations are described herein with reference to first structured text 412. For example, the USSD answer data 922 can be the ASCII text "Your mobile number is 360-820-1946". The textual representation can be a named string in a JSON object, e.g., '{"USSD String": "Your mobile number is 360-820-1946"}'. The second structured text 920 can include at least one of JSON or XML.

At 924, the control unit can send, to the terminal, a report message 926 comprising the USSD answer data 922. The report message 926 can include, e.g., a SIP MESSAGE request carrying the USSD answer data 922 in textual form, e.g., as JSON or XML.

Figure 10:
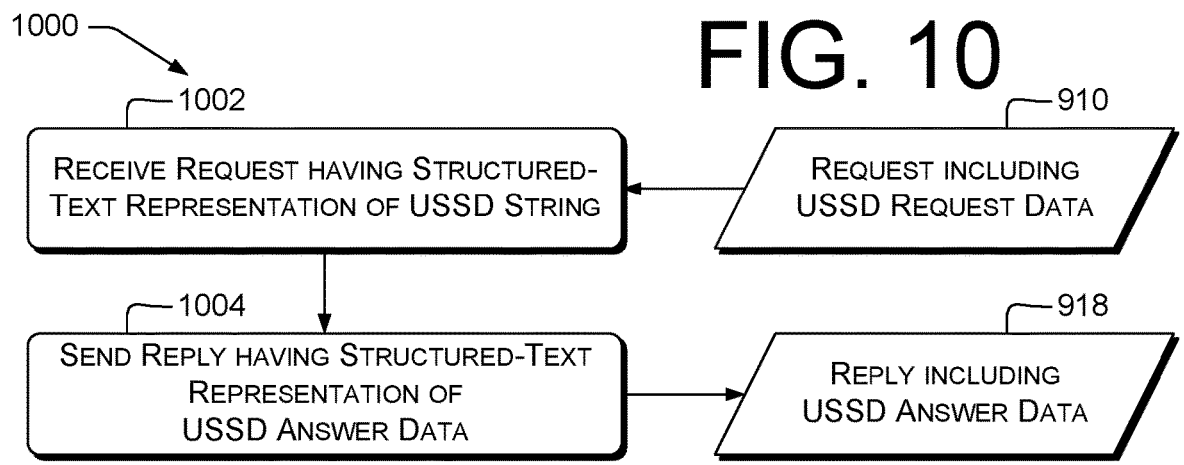
FIG. 10 illustrates an example process at a USSD gateway or other network device for providing USSD information, according to some implementations.

FIG. 10 is a dataflow diagram illustrating an example process 1000 for processing USSD requests, and related data items. Process 1000 can be performed, e.g., by a network node of home network 114, e.g., a USSD GW 224 communicatively connectable with a TAS 222, 228 of a telecommunications network, or by another server 304, FIG. 3. The network node can include a control unit. For example, the network node can include one or more processors (e.g., processor 324) configured to perform operations described below, e.g., in response to computer program instructions of USSD-processing module 330 stored in at least one CRM 326. For brevity, without limitation, examples herein are described with reference to O-IMS 214 and components thereof.

At 1002, the control unit can receive the request 910.

At 1004, the control unit can send, in response to the request 910, the reply 918.

Table 5 shows an example of first structured text 912 in request 910, and of second structured text 920 in reply 918.

TABLE 5

| First structured text 912 | Second structured text 920 |
|---|---|
| "USSD_Query": {<br>  "imsi": "9613300199005046f7",<br>  "Address digits": "310310990005647",<br>  "USSD String": "#686#",<br>  "gsmSCF-Address": "912160132321f2",<br>  "Address digits": "12063132122"<br>  "senderAddressURL":<br>    "http://10.178.85.37:9080"<br>} | "USSD_Response": {<br>  "Component": "returnResultLast",<br>  "USSD String": "Your mobile number is<br>    360-820-1946"<br>} |

Figure 11:
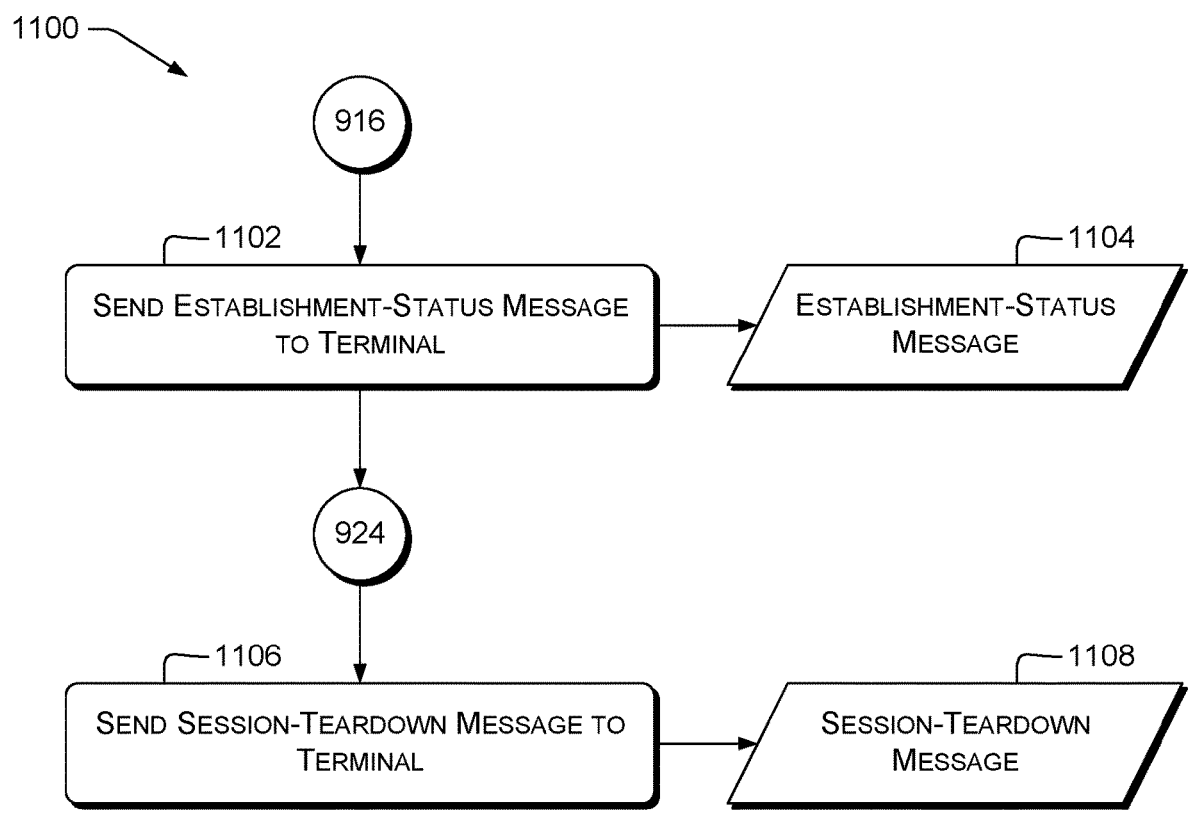
FIG. 11 illustrates example processes for providing USSD information to a terminal, according to some implementations.

FIG. 11 is a dataflow diagram illustrating an example process 1100 for establishing sessions, and related data items. Process 1100 can be performed, e.g., by a control unit of, e.g., a TAS 222, 228 or other server 304, FIG. 3. In some examples, block 916 can be followed by block 1102. In some examples, block 1102 can be followed by block 924. In some examples, 924 can be followed by block 1106.

At 1102, the first operations further comprise, after receiving the reply, sending, to the terminal, an establishment-status message 1104. The establishment-status message 1104 can include, e.g., a SIP 200 OK or 183 Session Progress message, or another SIP 2xx reply.

At 1106, the first operations further comprise, after sending the report message 926, sending, to the terminal, a session-teardown message 1108. For example, the session-teardown message 1108 can include a SIP BYE request. Block 1106 can be used, e.g., after sending the report message 926 comprising a SIP MESSAGE request.

Figure 12:
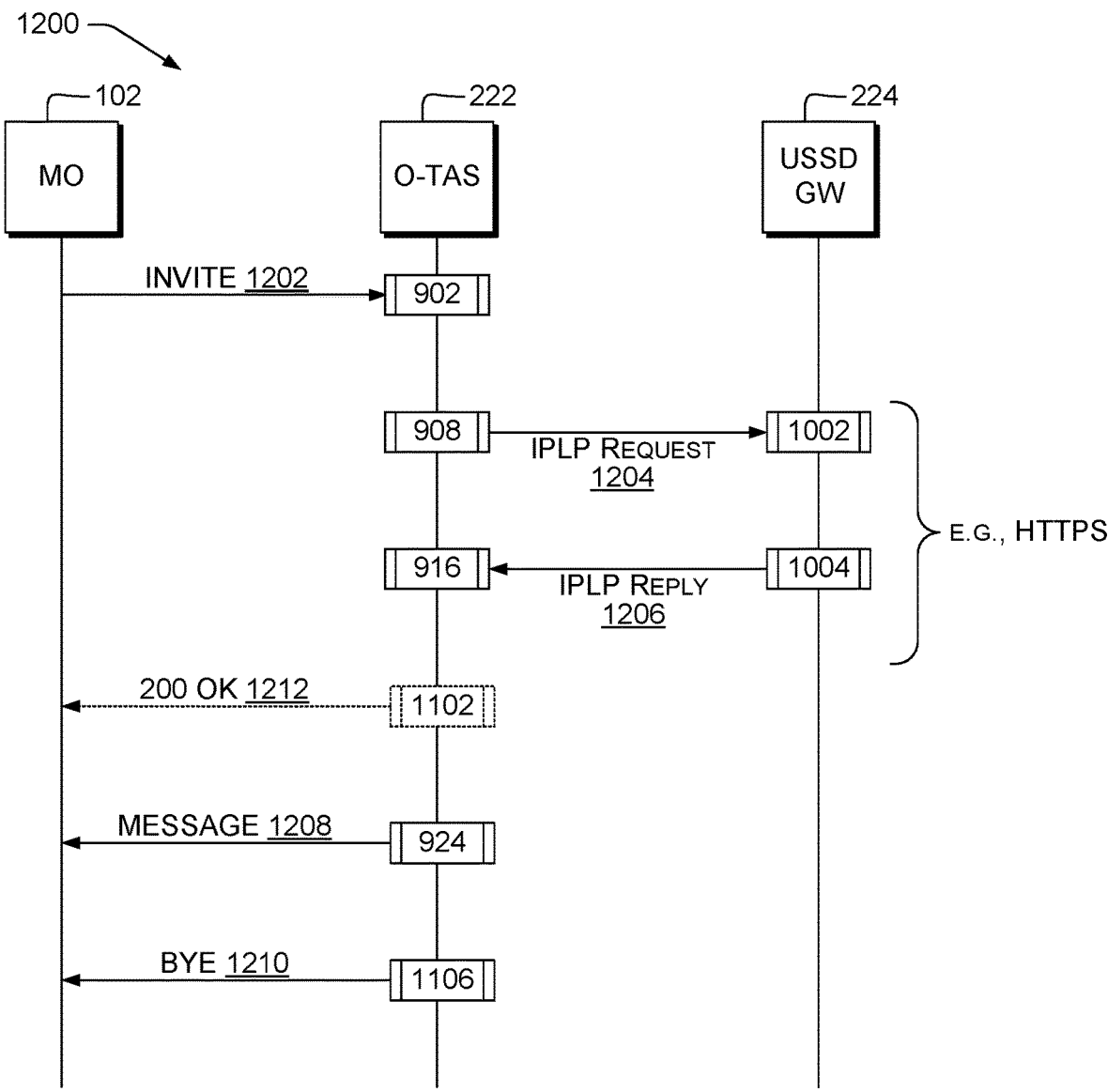
FIG. 12 is a call flow showing a USSD request and response, according to some implementations.

FIG. 12 shows a call flow 1200 illustrating an example of conducting a USSD exchange. Flow 1200 is shown with respect to an LTE originating terminal ("MO") 102; however, the flow can additionally or alternatively be used for sessions between devices on other types of networks. Reference is made to operations depicted in FIGS. 8 and 9 that can process transmission or receipt of the depicted messages. However, other operations can be used to process these messages. For brevity, messages are shown as traveling directly between terminal 102 and O-TAS 222. However, those messages can additionally or alternatively be conveyed hop-by-hop from terminal 102 to P-CSCF/ATCF 218 to S-CSCF 220 to O-TAS 222, and vice versa.

Terminal 102 transmits INVITE 1202, which can represent invitation request 904. INVITE 1202 can include USSD request data 906. O-TAS 222 receives INVITE 1202 at block 902. At block 908, O-TAS transmits an IPLP request 1204, e.g., an HTTPS request, to USSD GW 224. IPLP request 1204 can represent request 910 and can include first structured text 912.

USSD GW 224 receives the IPLP request 1204 at block 1002. USSD GW 224 performs known USSD processing to determine USSD answer data. USSD GW 224 then transmits IPLP reply 1206 at block 1004. IPLP reply 1206 can represent reply 918 and can include second structured text 920. O-TAS 222 receives IPLP reply 1206 at block 916. O-TAS 222 then sends report message 1208, including the USSD answer data, at block 924. Report message 1208, e.g., a SIP MESSAGE, can represent report message 926.

In some examples, after sending report message 1208, O-TAS 222 sends a session-teardown message 1210 at block 1106. Session-teardown message 1210 can represent session-teardown message 1108. Session-teardown message 1210, e.g., a SIP BYE, can trigger the release of resources held for the session, which began with INVITE 1202. For brevity, the responses of terminal 102 to report message 1208 and session-teardown message 1210 are not shown.

In some examples, depicted using dashed lines, O-TAS 222 sends a session-establishment message 1212 to terminal 102 after receiving IPLP reply 1206 (block 1102). The session-establishment message 1212 can be a SIP 200 OK reply. The session-establishment message 1212 can represent session-establishment message 1104.

Example Clauses

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method comprising, by a telephony application server (TAS), performing operations comprising: receiving, from an originating terminal, a session-initiation request comprising an identification of a called party; sending, to an information server, a first message comprising first structured text, wherein the first structured text comprises the identification of the called party; and subsequently, receiving, from the information server, a second message comprising second structured text, wherein: the second structured text comprises a destination-terminal address; and the destination-terminal address is dynamically bound to a terminal associated with the called party.

B: The method according to paragraph A, the operations further comprising: sending the first message via an Internet-Protocol-based Lightweight Protocol (IPLP); and receiving the second message via the IPLP.

C: The method according to paragraph B, wherein the IPLP comprises at least one of: HyperText Transfer Protocol (HTTP) or HTTP+Transport Layer Security (HTTPS).

D: The method according to any of paragraphs A-C, wherein: the session-initiation request comprises a Session Initiation Protocol (SIP) INVITE request; the first structured text comprises at least one of: JavaScript Object Notation (JSON) or Extensible Markup Language (XML); and the second structured text comprises at least one of: JSON or XML.

E: The method according to any of paragraphs A-D, the operations further comprising, after sending the first message and before receiving the second message: receiving a third message comprising third structured text, wherein the third structured text comprises an address of a location registry; and sending, to the information server, a fourth message comprising fourth structured text, wherein the fourth structured text comprises the identification of the called party.

F: The method according to any of paragraphs A-E, wherein: the first structured text comprises a textual representation of data of a GSM MAP anyTimeInterrogation query payload; and the second structured text comprises a textual representation of data of a GSM MAP sendRoutingInformation reply payload.

G: The method according to any of paragraphs A-F, the operations further comprising: sending, to a core network device, a second session-initiation request comprising the destination-terminal address.

H: The method according to any of paragraphs A-G, the operations further comprising: determining that at least: the called party is not attached to a packet-switched (PS) domain; or a circuit-switched retry timer has expired; and in response, sending the first message.

I: At least one computer-readable medium (CRM) comprising instructions that, when executed by at least one processor, cause the at least one processor to perform operations comprising: receiving a first message comprising first structured text, wherein the first structured text comprises an identification of a called party of a communication session; and in response, sending a second message comprising second structured text, wherein: the second structured text comprises a destination-terminal address; and the destination-terminal address is dynamically bound to a terminal associated with the called party.

J: The at least one CRM according to paragraph I, the operations further comprising: receiving the first message via an Internet-Protocol-based Lightweight Protocol (IPLP); and sending the second message via the IPLP.

K: The at least one CRM according to paragraph J, wherein the IPLP comprises at least one of: HyperText Transfer Protocol (HTTP) or HTTP+Transport Layer Security (HTTPS).

L: The at least one CRM according to any of paragraphs I-K, wherein: the first structured text comprises at least one of: JavaScript Object Notation (JSON) or Extensible Markup Language (XML); and the second structured text comprises at least one of: JSON or XML.

M: The at least one CRM according to any of paragraphs I-L, the operations further comprising, after receiving the first message and before sending the second message: sending a third message comprising third structured text, wherein the third structured text comprises an address of a location registry; and receiving a fourth message comprising fourth structured text, wherein the fourth structured text comprises the identification of the called party.

N: The at least one CRM according to any of paragraphs I-M, wherein: the first structured text comprises a textual representation of data of a GSM MAP anyTimeInterrogation query payload; and the second structured text comprises a textual representation of data of a GSM MAP sendRoutingInformation reply payload.

O: A telecommunications network comprising: a telephony application server (TAS) communicatively connectable with a terminal; and an Unstructured Supplementary Service Data (USSD) gateway; wherein the TAS is configured to perform first operations comprising: receiving, from the terminal, an invitation request comprising USSD request data; sending to the USSD gateway, via an Internet-Protocol-based Lightweight Protocol (IPLP), a request comprising first structured text indicating the USSD string and an identifier of the terminal; receiving, from the USSD gateway in response to the request via the IPLP, a reply comprising second structured text representing USSD answer data; and sending, to the terminal, a report message comprising the USSD answer data; and wherein the USSD gateway is configured to perform second operations comprising: receiving the request; and sending, in response to the request, the reply.

P: The telecommunications network according to paragraph O, wherein: the invitation request comprises a Session Initiation Protocol (SIP) INVITE request; the IPLP comprises at least one of: HyperText Transfer Protocol (HTTP) or HTTP+Transport Layer Security (HTTPS); the first structured text comprises at least one of: JavaScript Object Notation (JSON) or Extensible Markup Language (XML); and the second structured text comprises at least one of: JSON or XML.

Q: The telecommunications network according to paragraph O or P, wherein: the report message comprises a SIP MESSAGE request; and the first operations further comprise, after sending the report message, sending, to the terminal, a session-teardown message.

R: The telecommunications network according to paragraph Q, wherein the session-teardown message comprises a SIP BYE request.

S: The telecommunications network according to any of paragraphs O-R, wherein: the report message comprises a SIP MESSAGE request; and the first operations further comprise, after receiving the reply, sending, to the terminal, an establishment-status message.

T: The telecommunications network according to any of paragraphs O-S, wherein the second structured text comprises a textual representation of the USSD answer data.

U: Any of paragraphs B-H, J-N, or O-T, wherein the IPLP is selected from the group consisting of: HTTP, HTTPS, SIP, and SIPS.

V: Any of paragraphs B-H, J-N, or O-T, wherein the IPLP is HTTPS.

W: A computer-readable medium, e.g., a computer storage medium, having thereon computer-executable instructions, the computer-executable instructions upon execution configuring a computer to perform operations as any of paragraphs A-H, I-N. O-T, U, or V recites.

X: A device comprising: a processor; and a computer-readable medium, e.g., a computer storage medium, having thereon computer-executable instructions, the computer-executable instructions upon execution by the processor configuring the device to perform operations as any of paragraphs A-H, I-N. O-T, U, or V recites.

Y: A system comprising: means for processing; and means for storing having thereon computer-executable instructions, the computer-executable instructions including means to configure the system to carry out a method as any of paragraphs A-H, I-N. O-T, U, or V recites.

Conclusion

Various aspects described above permit reducing the number of wrapper protocols used by messages, e.g., session-initiation messages or USSD messages. Various aspects reduce the protocol overhead of these or other types of messages. As discussed above, technical effects of various examples can include reducing bandwidth usage and reducing network load.

Example components and data transmissions in FIGS. 1-3; example data exchanges in the call flow diagrams of FIGS. 8 and 12, and example blocks in the process diagrams of FIGS. 4-7 and 9-11 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data.

Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Although some features and examples herein have been described in language specific to structural features and/or methodological steps, it is to be understood that the appended claims are not necessarily limited to the specific features or steps described herein. Rather, the specific features and steps are disclosed as example forms of implementing the claimed technology. For example, network 306, processors 312 and 324, and other structures or systems described herein for which multiple types of implementing devices or structures are listed can include any of the listed types, and/or multiples and/or combinations thereof.

Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. All examples herein are nonlimiting unless otherwise expressly indicated.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order. Any parenthetical comments in the Abstract are examples provided for ease of understanding.

What is claimed is:

1. A method comprising, by a telephony application server (TAS), performing operations comprising:

receiving, from an originating terminal, a session-initiation request comprising an identification of a called party;
sending, to an information server, a first message comprising first structured text, wherein the first structured text comprises the identification of the called party;
receiving a second message comprising second structured text, wherein the second structured text comprises an address of a location registry;
sending, to the information server, a third message comprising third structured text, wherein the third structured text comprises the identification of the called party; and
receiving, from the information server, a fourth message comprising fourth structured text, wherein:
the fourth structured text comprises a destination-terminal address; and
the destination-terminal address is dynamically bound to a terminal associated with the called party.

2. The method according to claim 1, the operations further comprising:
sending the first message via an Internet-Protocol-based Lightweight Protocol (IPLP); and
receiving the second message via the IPLP.

3. The method according to claim 2, wherein the IPLP comprises at least one of: HyperText Transfer Protocol (HTTP) or HTTP+Transport Layer Security (HTTPS).

4. The method according to claim 1, wherein:
the session-initiation request comprises a Session Initiation Protocol (SIP) INVITE request;
the first structured text comprises at least one of: JavaScript Object Notation (JSON) or Extensible Markup Language (XML); and
the second structured text comprises at least one of: JSON or XML.

5. The method according to claim 1, wherein the second message is received and the third message is sent after sending the first message and before receiving the fourth message.

6. The method according to claim 1, wherein:
the first structured text comprises a textual representation of data of a GSM MAP anyTimeInterrogation query payload; and
the fourth structured text comprises a textual representation of data of a GSM MAP sendRoutingInformation reply payload.

7. The method according to claim 1, the operations further comprising:
sending, to a core network device, a second session-initiation request comprising the destination-terminal address.

8. The method according to claim 1, the operations further comprising:
determining that at least:
the called party is not attached to a packet-switched (PS) domain; or
a circuit-switched retry timer has expired; and
in response, sending the first message.

9. At least one non-transitory computer-readable medium (CRM) comprising instructions that, when executed by at least one processor, cause the at least one processor to perform operations comprising:
receiving a first message comprising first structured text, wherein the first structured text comprises an identification of a called party of a communication session; and
sending a second message comprising second structured text, wherein the second structured text comprises an address of a location registry;
receiving a third message comprising third structured text, wherein the third structured text comprises the identification of the called party; and
at least partly in response to receiving the first message, sending a fourth message comprising fourth structured text, wherein:
the fourth structured text comprises a destination-terminal address; and
the destination-terminal address is dynamically bound to a terminal associated with the called party.

10. The at least one non-transitory CRM according to claim 9, the operations further comprising:
receiving the first message via an Internet-Protocol-based Lightweight Protocol (IPLP); and
sending the second message via the IPLP.

11. The at least one non-transitory CRM according to claim 10, wherein the IPLP comprises at least one of: HyperText Transfer Protocol (HTTP) or HTTP+Transport Layer Security (HTTPS).

12. The at least one non-transitory CRM according to claim 9, wherein:
the first structured text comprises at least one of: JavaScript Object Notation (JSON) or Extensible Markup Language (XML); and
the fourth structured text comprises at least one of: JSON or XML.

13. The at least one non-transitory CRM according to claim 9, wherein the second message is sent and the third message is received after receiving the first message and before sending the fourth message.

14. The at least one non-transitory CRM according to claim 9, wherein:
the first structured text comprises a textual representation of data of a GSM MAP anyTimeInterrogation query payload; and
the fourth structured text comprises a textual representation of data of a GSM MAP sendRoutingInformation reply payload.

15. A telecommunications network comprising:
an application server and
a gateway;
wherein the application server is configured to perform first operations comprising:
receiving, from a terminal, an invitation request comprising request data;
sending to the gateway a request comprising first structured text indicating a Unstructured Supplementary Service Data (USSD) string and an identifier of the terminal;
receiving, from the gateway in response to the request, a reply comprising second structured text representing USSD answer data; and
sending, to the terminal, a report message comprising the USSD answer data; and
wherein the gateway is configured to perform second operations comprising:
receiving the request; and
sending, in response to the request, the reply.

16. The telecommunications network according to claim 15, wherein:
the invitation request comprises a Session Initiation Protocol (SIP) INVITE request;

the request is sent via an at least one of: HyperText Transfer Protocol (HTTP) or HTTP+Transport Layer Security (HTTPS);

the first structured text comprises at least one of: JavaScript Object Notation (JSON) or Extensible Markup Language (XML); and the second structured text comprises at least one of: JSON or XML.

17. The telecommunications network according to claim 15, wherein:

the report message comprises a SIP MESSAGE request; and the first operations further comprise, after sending the report message, sending, to the terminal, a session-teardown message.

18. The telecommunications network according to claim 17, wherein the session-teardown message comprises a SIP BYE request.

19. The telecommunications network according to claim 15, wherein:

the report message comprises a SIP MESSAGE request; and the first operations further comprise, after receiving the reply, sending, to the terminal, an establishment-status message.

20. The telecommunications network according to claim 15, wherein the second structured text comprises a textual representation of the USSD answer data.

* * * * *